(12) United States Patent
Worrall

(10) Patent No.: US 7,312,712 B1
(45) Date of Patent: Dec. 25, 2007

(54) TRAVELER SAFETY NOTIFICATION SYSTEM

(76) Inventor: Douglas Bevan Worrall, 9 Hopson Avenue, Camden South, NSW (AU) 2570

( * ) Notice: Subject to any disclaimer, the term of this patent is extended or adjusted under 35 U.S.C. 154(b) by 0 days.

(21) Appl. No.: 11/733,787

(22) Filed: Apr. 11, 2007

(51) Int. Cl.
*G08B 23/00* (2006.01)

(52) U.S. Cl. .............................. 340/573.4; 340/309.16; 340/539.11; 379/38; 379/45; 455/90.1; 455/404.1

(58) Field of Classification Search ............. 340/573.1, 340/573.4, 539.11, 539.13, 539.16, 539.17, 340/309.16, 309.7; 379/37, 38, 45, 48; 455/404.1, 455/404.2, 412.2, 90.1, 456.1, 456.6, 457; 709/204–207, 217–219
See application file for complete search history.

(56) References Cited

U.S. PATENT DOCUMENTS

| | | | |
|---|---|---|---|
| 6,505,203 B1* | 1/2003 | Adler | ........................... 707/10 |
| 7,026,928 B1 | 4/2006 | Lane | |
| 7,047,203 B2 | 5/2006 | Johnson | |
| 2002/0107927 A1 | 8/2002 | Gallant | |
| 2002/0118796 A1* | 8/2002 | Menard et al. | ................ 379/45 |
| 2004/0152441 A1* | 8/2004 | Wong | ....................... 455/404.1 |
| 2004/0198315 A1 | 10/2004 | Vellotti | |
| 2004/0220841 A1 | 11/2004 | Fairweather | |
| 2007/0156692 A1* | 7/2007 | Rosewarne | .............. 340/573.1 |

OTHER PUBLICATIONS

Author: Arizona Court of Appeals: Title: Ruling/Opinion in the case of *Rodney L. Joffe* vs. *Acacia Mortgage Corporation*, Filed Sep. 20, 2005. PDF of opinion:from:http://www.cofad1.state.az.us/opinionfiles/CV/CV020701.pdf Ref: Para 12 (p. 7) through Para 21 (p. 12), in which cellular SMS messages are deemed "telephone calls".

* cited by examiner

*Primary Examiner*—Thomas Mullen

(57) ABSTRACT

An Internet-based system which enhances the safety of travelers, operated via website or mobile messaging text messages. The user provides identity and contact details for himself/herself and a contact person. The user then provides travel plan information and an alert time, thus arming a monitoring process which monitors for alert time expiry. If the user disarms the system no alert notification will occur. Should the user fail to disarm before the alert time, or if an emergency activation message is received from the user, the contact person is alerted by email and/or text message and notification information is made available on a secure notification website. Other embodiments are described.

20 Claims, 10 Drawing Sheets

TRAVELER SAFETY NOTIFICATION SYSTEM

CROSS-REFERENCE TO RELATED APPLICATIONS

Not applicable

FEDERALLY SPONSORED RESEARCH

Not applicable

SEQUENCE LISTING

Not applicable

BACKGROUND

1. Field of Invention

This invention relates to an Internet-based traveler safety notification system which allows users to record details of planned travel and specify an alert time, thereby arming a monitoring system, and a notification process in which a trusted person is alerted and provided with the user's travel plan if the user fails to disarm the system before his/her specified alert time or sends an emergency activation message.

2. Prior Art

Many people travel the world alone, often to hazardous places or places where few others travel. A responsible traveler would take the time to let someone know where they are going and when they expect to get back, as a minimum safety precaution before setting out on a higher risk outing. This can present difficulties, especially if the traveler is traveling in a foreign country far from home, friends and relatives. There also a privacy consideration, where the traveler may not to wish to concern a friend or relative if elevated-risk travel is contemplated and thus may be disinclined to take such a precaution.

In the absence of definite advice regarding when a traveler may contact them next, the first inkling a family or friend may have that a traveler is missing may be an extended period since their last contact. For example, the traveler may have been sending occasional emails outlining his or her travel, but may not have sent one for awhile. Upon taking these concerns to the authorities for help in locating the missing traveler their concerns may well be dismissed as the "unreliability of youth". In the absence of any actual evidence that the traveler is at risk, enlisting the help of the authorities can be difficult or delayed. Also, in the absence of specific details of the traveler's planned travel the authorities will have little to go on and a poorly defined starting point for their search.

U.S. Pat. No. 7,047,203 to Johnson (2006) discloses a system in which users can advise of their itinerary and initiate an automatic monitoring process which will notify a selected person if the participant fails to cancel his or her itinerary before a specified time. Johnson's system relies on notifying selected people via telephone call, a method which does not give those people a written record of the missing traveler's itinerary and has problems with expense in the global context, and of inability to provide notification at all if the selected contact person is not currently contactable via telephone. Also, in the high-stress situation of a parent being advised that their son or daughter may be missing a verbal transcript of details would be prone to error and omission when relayed to the authorities, highlighting the problem of a lack of written notification.

Johnson's system is also unnecessarily complex in that it requires a participant to remember a unique "cancellation code" every time a travel plan is entered, without which the participant is unable to cancel the monitoring process. Remembering any password or code is difficult if not used regularly so the requirement to remember an additional unique code over and above the normal login password will increase the level of false alarms, due to a user's inability to cancel monitoring because they cannot remember today's cancellation code.

U.S. Pat. No. 7,026,928 to Lane (2006) discloses a system which also monitors the safety of a mobile user. In that disclosure Lane's system is programmed with a list of locations and time frames in which the user will be in those locations, and then monitors safety by sending signals to a mobile communication device to which the mobile user must respond. If the user fails to respond the system will initiate a security response including the notification of specified people that the user may be at risk. Lane's system thus requires the user to be in continual telecommunications contact (such as remaining within mobile phone coverage areas for the entire period of monitoring) and thus is unsuitable for people wishing to travel to remote areas in which continuous telecommunications coverage may be unreliable or non-existent.

U.S. patent application Ser. No. 10/028,901 by Gallant, published as US2002/0107927 describes an Internet-based safety system in which a notification to a contact is also made after a defined time if the user does not cancel monitoring. Gallant's claims include a means whereby, upon activation of an alert, the system interrogates a wireless network for its position and sends the position data to the user's specified emergency contact. The technique for achieving this position interrogation is not described and may require hardware or telecommunications system characteristics not widely available.

Gallant describes, although does not claim, several embodiments in which some kind of notification is made to the emergency contact after the "end time" specified by the user. Notable for its absence in the operation of his system or in its notifications is an actual description by the user of the user's plans or intentions. The user can specify an "event name" for the event being monitored, and a "return date and time" which defines monitoring expiry, and a range of fixed personal information such as name, address, phone number, HIV status etc., although nowhere in his system does the user describe his/her intentions or plan. Gallant presumably does not feel that plan or intention information is useful as he relies in his notifications on positional data being retrieved from the user's mobile device on alert activation. His system, therefore, relies on an unknown position determination technique which will require the user to be in telecommunications contact at the time of the alert for any useful data to be provided to the emergency contact in the event of an alert.

U.S. Patent Application 20040220841 by Fairweather (2004) discloses a traveler itinerary alerting system which does allow the entry of travel itinerary data into his system and the delivery of that information if the user has not canceled the itinerary by a specified period after planned arrival time at destination. Fairweather recognizes the dangers associated with sending personal information via email, suggesting that system emails can have a digital signature applied to them to ensure their authenticity. This approach allows a recipient of a certain skill level or using certain email programs to confirm the identity of the sender and detect any modifications to the message contents.

However, the use of digital signatures in emails has several problems. To properly utilize a digital signature the recipient of the email message must install a "digital certificate public key" provided by Fairweather's system or an independent certificating authority into their email program. This is a task which many would not know how to do, and which adds a level of complexity to the process which may deter those people who are only moderately comfortable with computers, email and the Internet. While the contents of digitally signed email message will be readable without the installation of such a certificate, in this circumstance some email programs (for example, the common Microsoft Outlook Express) may display a "security alert" message, thus causing a suspicion where perhaps none had previously existed. Further, web-based email programs, such as "Hotmail" and "Yahoo Mail", do not allow for digital signatures, so the provision of the signature in these cases is moot.

Furthermore, a digital signature only has value if the recipient expects to see one. If a recipient receives an email without one, such as is the case with most emails we receive, most people would think nothing of it. Thus, should a malicious third party create and send to a recipient an email purporting to be from the safety system (which would presumably be without a digital signature) there is every possibility that it would be believed. This is clearly unacceptable.

A further problem with the sending emails is that they are not secure. They are not encrypted in any way and, by the nature of the Internet itself, pass through several unidentified and uncontrolled computers on their way to you. Thus any personal information included is available for inspection by various third parties of unknown intent. The low security level of such messages may act as a deterrent to the user of a safety system from providing a full detailed range of information out of fear that it may be intercepted by unknown persons if sent in an alert message.

U.S. Patent Application 20040198315 by Vellotti (2004) discloses a system very similar to Fairweather's, in which a user can enter trip/alert information, including an expected time of return from a trip and contact information for an emergency contact person. If the user has not returned from the trip by the expected time of return Vellotti's system transmits an "alert message" to the emergency contact message. Vellotti also provides for deactivation of his system using voice recognition via a telephone, and the transmittal of a voice message to the emergency contact person.

The only contact methods described by Vellotti for the transmittal of information to the emergency contact person are via email message, telephone message and pager message. My previous comments regarding Fairweather's email notification, and the security issues involved apply equally to Vellotti. Similarly, my comments regarding telephone notification have the problem of not providing a written record of the alert, although it is possible that Vellotti would also provide this in a low-security email. His pager message requires the contact person to ring up to hear the recorded voice message mentioned earlier, again presenting problems with the lack of a written copy of the call. Vellotti does not teach or suggest the provision of notification via a secure website, or other secure transmission means.

While Vellotti does discuss the use of a telephone to setup or modify trip/alert information and deactivate the system after returning from a trip he does not suggest or describe the use of mobile messaging techniques, such as SMS messaging, to solve this problem. His usage of the telephone is quite specifically directed at voice recognition techniques. As such, the user would be presented with increase cost of usage (voice calls generally costing more than SMS messages), increased phone battery requirements (an SMS message is power-efficient compared to a voice message), and possible misinterpretation of voice activation commands.

All of the cited prior art described notification methods which deliver basic information as it is known at the time of the alert. There is no provision to provide enhanced information which may provide additional assistance to the contact person and which may be updated as time progresses, such as search area weather, governmental travel alerts, news items involving vehicle accidents, or any other data relevant to the search area. Thus, there is no active involvement by their systems with the contact person once they have delivered their message.

Against this background of prior art, there exists a need for a traveler safety notification system which:

1. provides a means to receive and retain information about a traveler's plans or itinerary;
2. is simple to use, with no unnecessarily complicated steps or actions required;
3. reliably provides alert notifications to trusted contact people in a written form;
4. does not rely on the traveler being in continuous telecommunications contact;
5. does not require the traveler to be in telecommunications contact at the time of the alert;
6. does not rely on technology not commonly available;
7. provides a secure means of providing personal and travel plan information to a contact person which is simple and will work on all systems with all levels of recipient experience;
8. may be operated remotely without Internet access, using a commonly available mobile device such as a mobile phone or cellphone in an efficient, easy to use way which minimizes opportunities for error; and
9. provides enhanced information relevant to the likely search area, thereby being of continued assistance to the contact person after being notified of an alert.

My described embodiments address these issues and meet this need.

SUMMARY

In accordance with one embodiment, an Internet-based computer system which provides means to allow a plurality of individual users to register their personal details, record contact details for at least one contact person, save a travel plan, and set an alert time thereby arming a monitoring process, a means of alerting the contact person if the user fails to disarm the monitoring process before his/her alert time or if the user sends an emergency activation message, and providing the user's travel plan and other useful data to the contact person in a secure electronic written form.

DETAILED DESCRIPTION

The purpose of the embodiments described herein are to provide an individual user, who may be a traveler or someone going on an excursion or outing, a means of saving details about planned travel which would be made available to a contact person in the event of some misadventure. The provision of this information would alert the contact person to the fact that the traveler may be in danger, assist in the task of locating the user, and assist in enlisting the help of the authorities if necessary.

A traveler would use a system as described herein to increase his/her level of safety by increasing the chances of someone coming looking should some mishap occur, and to increase the chances of such a search being timely and successful. There are many reasons why a traveler may fail to successfully complete a planned outing, ranging from innocent causes such as transportation difficulties, bad weather, illness or injury, through to criminal or terrorist activities such as kidnapping or assault resulting in bodily harm. In all such cases it may be of assistance if someone were notified such that a search can be initiated quickly and recovery action commenced.

Broadly, a system is described with various embodiments which will provide a traveler with a means of leaving details regarding a proposed travel plan in such a form that the information would be useful to a searcher should the need arise. Also described is a means for the traveler to specify an "alert time", which will be the time by which the user expects to have completed his/her travel and advised the system that he/she is safe. A means for alerting a trusted contact person and a means of making the proposed travel plan available to that contact person should the traveler fail to check in by the alert time are provided. The travel plan information is provided in a secure electronic written format which will minimize the possibility of information errors and help the contact person enlist the aid of the authorities should that be deemed necessary.

Figure 1:
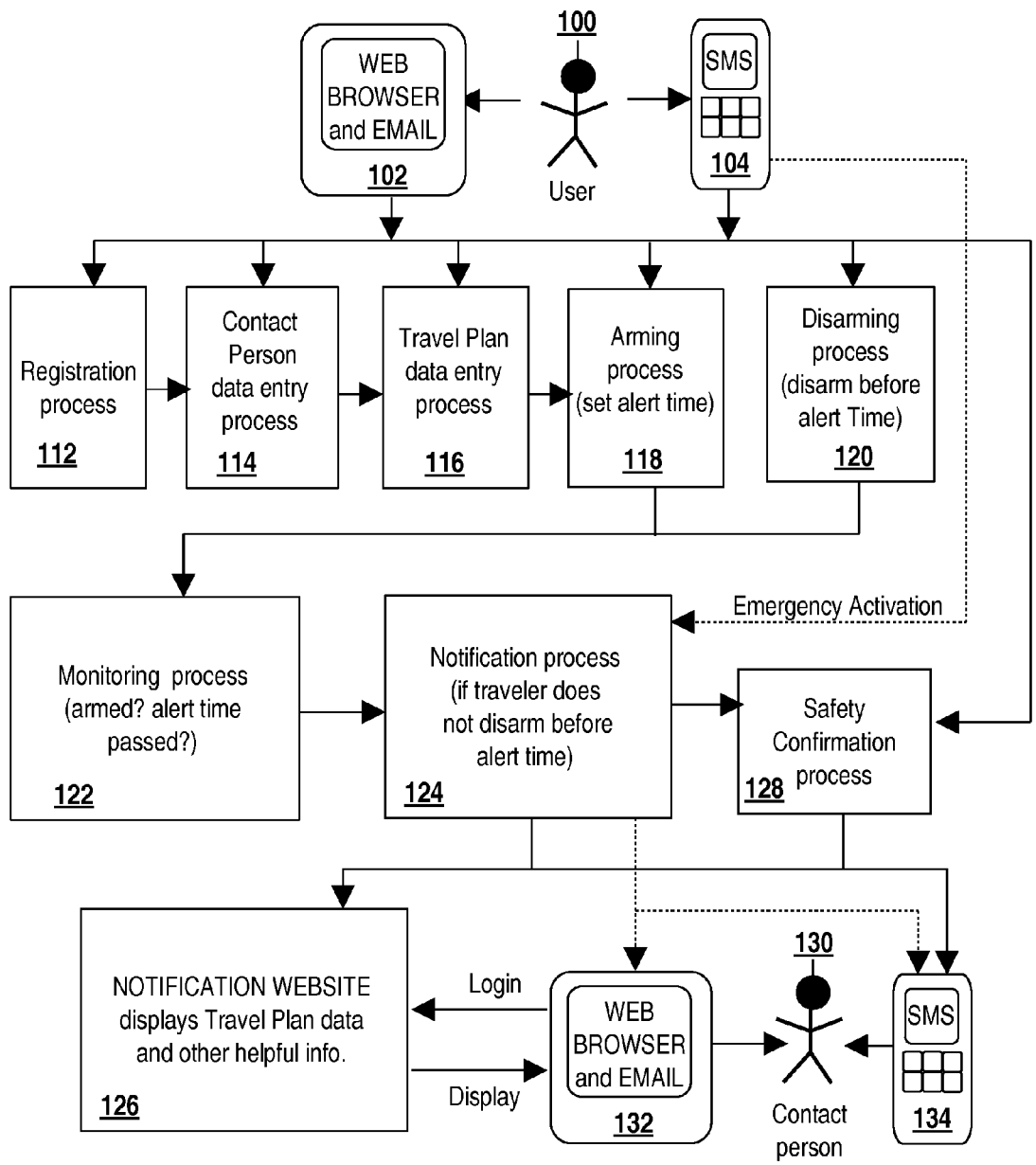
FIG. 1—System overview.

My currently preferred embodiment is illustrated in FIG. 1, in which is shown a user 100, a related collection of system processes 112-128, and a contact person 130. While an individual user is shown, a plurality of individual users may use the system independently, with the system providing a personal service to each as illustrated. While a single contact person is shown each user may, in some embodiments, specify more than one contact person.

User 100 interacts with the system primarily using web browser running on an Internet-connected device 102 such as a computer, personal digital assistant, mobile telephone or the like, via a system website (not shown). Alternate interaction methods include the transmission and reception of mobile messaging text messages sent to/from the user's mobile messaging device 104. An example of such would be SMS (Short Message Service) text messages sent from and to an SMS-capable mobile phone or cellphone.

Contact person 130 is a person specified by the user to receive notifications from the system should the user's safety be in doubt. Generally the user will specify a friend, relative, colleague etc. to be this contact person, although any entity such as a police force or other such authority, organization or security service with an email address may be specified. An advantage of using a friend, relative or colleague to be the contact person is that, should a false alarm occur, the authorities are not needlessly involved, thereby reducing the "boy-who-cried-wolf" response degradation effect.

Communication with contact person 130 is primarily via notification website 126 viewable using website access device 132, which may be a web browser running on an Internet-connected device such as a computer, personal digital assistant, mobile telephone or the like. Contact person 130 is alerted that new information is available on notification website 126 by an email message viewable using his/her email access device 132 and/or a text message to mobile messaging device 134. Such messages would include access details for notification website 126.

System processes 112-128 configure an Internet-based computer system of one or more computers, with associated data management, storage and communication interfaces as required.

Registration process 112 is the first step required of the user. Using this process the user provides such information as is required to identify himself/herself to the system in subsequent communications, a necessary step for a multi-user system. A unique identification code or username is issued to the user by this process which may, in my currently preferred embodiment, be the user's email address.

A primary purpose of registration process 112 is to obtain communications contact information from the user. Such information includes an email address and may include a mobile messaging address such as the phone number of an SMS-capable mobile phone or cellphone. Such data has a dual use, providing communications delivery addresses for messages from the system and means of uniquely identifying each user.

These details are stored associated with the user for later retrieval, meaning that the stored information can be specifically retrieved by the system for operations or processes involving this particular user. An example of this, as used in my currently preferred embodiment, would be the saving of data in a database record along with a reference code uniquely associated with this user, such that data can be retrieved by the system for this particular user by searching stored database records for an individual database record containing the user's unique reference code.

Contact person data entry process 114 is the next step required before the user can use the system as a whole, which allows user 100 to provide contact details for contact person 130. The contact details for any such contact person will include at least an email address. User 100 may also, in some embodiments, enter a mobile messaging address for the contact person's mobile messaging device which will allow text messages to be sent from the system to contact person 130. These details are stored associated with the user for later retrieval.

After completing the preceding steps the user may now proceed to setup the system to monitor his/her travels. The remaining processes 116-128 apply each time the user wishes to have a travel plan monitored by the system.

Travel plan data entry process 116 allows user 100 to enter details about an upcoming journey, trip or excursion, which may include an itinerary or route description, contact details at destination, travel company contact details etc., and other such information which may be of assistance in locating the user should he/she go missing. Various methods of data entry are described later. After entering information relevant to the user's upcoming travel that information is stored associated with the user for later retrieval.

Arming process 122 is then used by user 100 to enter an alert time, being a time before which the user intends to disarm the system. Such an alert time would generally be the time at which the user would want contact person 130 to be notified should the user have failed to disarm the system. The arming process then stores this alert time associated with the user for later retrieval. In this embodiment the act of saving the alert time arms monitoring process 122, although in other embodiments this might be done as a separate step, as will be described later.

Once it has been armed monitoring process 122 checks, on a periodic or as-required basis, whether the alert time stored for user 100 has passed without the user disarming the system.

Disarming process 120 is used by user 100, in the normal course of events, to disarm the monitoring process at the completion of the user's travel excursion. By disarming the system before the user's alert time monitoring process 122 is terminated or suspended for that user and no alert will be sent to contact person 130. The user's travel plan, alert time, and monitoring process 122 are reset by this disarming process, ready for the user's next use of the system.

Should user 100 fail to disarm monitoring process 122 before his/her specified alert time, monitoring process 122 will detect that fact on its next operation after the alert time has passed. In that case monitoring process 122 initiates notification process 124, which handles various notification tasks such as alerting contact person 130.

In some embodiments monitoring process 122 may send user 100 a reminder message, by email and/or mobile messaging text message, at a time approaching the user's alert time. This is to remind the user to disarm the system, thereby reducing the number of false alarms attributable to user forgetfulness.

Notification process 124 is activated by monitoring process 122 if user 100 fails to disarm the system before his/her specified alert time, such as might happen if some misadventure were to befall the user while conducting his/her travel thus rendering the user unable to disarm. This commences a period of time called the "alert phase", which is the period in which we have concern about to the user's safety. If such failure to disarm the system occurs, thus starting the alert phase, the notification process will prepare notification website 126 with the user's travel plan details and other useful information.

Notification website 126 may be a part of the system website, or a separate website altogether, but its defining characteristic is that it provides contact person 130 with information regarding user 100, including the user's travel plan data. Notification website 126 may be provided over a secure channel, meaning that the communications between the website and the website user are encrypted by some means, such as by the SSL encryption method or similar, as commonly used in banking and Internet commerce websites. Such a method provides secure communications with no specific action required by the user to initiate encryption and accessible with commonly available web browser programs.

After preparation of notification website 126 an alert is sent to contact person 130 to advise him/her that urgent information is available. The alert may be sent via email viewable on device 132 (or any other means of accessing the contact person's email account) and/or via mobile messaging text message to device 134. Such an alert will advise contact person 130 that action is required regarding user 100, and would include access details for notification website 126, thereby facilitating secure login to that website by contact person 130. Such access details may include a URL (Internet website address) and a unique access code, like a password, used by the system to restrict the availability of information to the specified contact person only. Contact person 130 would, upon receipt of such a message, visit website 126 using a web browser (possibly by clicking a URL link in the email message) and login using the unique access code sent in the message. In some embodiments, other information which may assist in the identification by the system of the user's contact person (such as his/her email address and/or other information known only to the user and the contact person, for example) may be required. In another embodiment the link in the alert sent to the contact person would include an encoded link, such that clicking on that link would automatically provide website 126 with the access code.

In my currently preferred embodiment the access code, being uniquely supplied by the system in relation to one particular user, also serves to identify which user's data is to be viewed, in the event that more than one user has specified this particular contact person. Other embodiments may provide alternate methods for identifying the user in question, such as selection of the user from a list displayed to the contact person after login to the notification website.

Contact person 130 would then have, via website 126, access to detailed information about user 100, such as the user's travel plan. Other information which may be of assistance to the contact person in locating the user may also be available, such as historical records of previous travel plans, previous travel companion names, locations of previous use etc. and contact details for any other contact person or persons the user may have specified, to assist all contact persons for that user in coordinating their efforts. Enhanced information, being real-time information relating to the user's approximate location, such as weather reports and travel warnings, may also be provided on website 126.

Because of the fact that contact person 130 has visited a website to retrieve information rather than rely on that which might be provided in an email message alone, a range of enhanced information services may be provided at the contact person's request. Such enhanced information may include contact details (and, if available, website links) for police forces or other authorities or organizations (such as search and rescue organizations, medical evacuation organizations, kidnap rescue organizations etc.) which may be of assistance. Other information may be a display of user 100's last known position and/or planned route overlaid on a map, or aerial or satellite image, relevant information regarding the search area (such as current and forecast weather, political or civil unrest updates, natural disasters, breaking safety related news events etc.), carried equipment descriptions and capability estimates etc. An expert system process (not shown) may, via website 126, provide suggestions for the best course-of-action based on past results in similar situations and other parameters, and/or based on preprogrammed course-of-action rules. Alternately, generic or tailored course-of-action suggestions may be provided (such as a generic or tailored "missing person strategy guide", or other course-of-action suggestions). A reliability-rating for user 100 may also be displayed, based partly on the user's history of false alarm events.

As can be seen by the previous paragraph, an entire portfolio of information relevant to the user and the search area can be presented by virtue of website 126, far more than could usefully be provided in an email alone. Any of this breadth of information may be printed by contact person 130 (using a printer, not shown, attached to the his/her website access device 132), thereby providing the contact person with a written hard copy for reference and to give to the authorities should that be deemed necessary.

In some embodiments notification process 124 may be activated immediately by the user rather than waiting for alert time expiry. This would be done by the user sending an appropriate mobile messaging text message, using mobile messaging device 104, to the system. This emergency activation feature, illustrated by the dashed line connecting device 104 with notification process 124, would function irrespective of whether or not the user has armed monitoring process 122.

In some embodiments a further task performed by notification process 124 is to send an email to user 100 to advise that his/her alert time has passed and an alert message has been sent to contact person 130. Such an email message would be viewable by the user the next time he/she checks his/her email messages using an Internet-connected device 102. This advice may also be sent as a text message to the user's mobile messaging device 104.

Safety confirmation process 128 may be provided in some embodiments, a process which provides a means for user 100 to advise the system that he/she is safe after having failed to disarm the system in time to prevent the delivery of alert messages to the contact person. This process may be accessed by the user via the system website using Internet-connected device 102, or by sending an appropriate text command message to the system from the user's mobile messaging device 104.

When the user accesses safety confirmation process 128 contact person 130 is sent an email message to his/her email address and, in some embodiments, a text message is sent to the contact person's mobile messaging device 134. Such messages would include information that the user has contacted the system and advised of his/her safety. This serves the role of quickly reassuring the contact person that the user is not actually in danger and may have failed to disarm the system for reasons other than being in danger, or that danger has now passed.

The illustration of FIG. 1 which has been discussed is my currently preferred embodiment, but other variations are possible which are covered by the claims. Some variants are also discussed in the operational description of each process which follows.

It is a requirement of the system that a means of uniquely identifying individual users exist such that a plurality of users can use the system independently. It is also a requirement that the system have contact details for each user, being at least an email address, for directed communications to the user from the system. The acquisition of this information is the primary goal of the registration process.

Such a registration process is a common practice among membership style websites and is, therefore, not new. It is included here as a description and also forms part of the claims as it demonstrates that a user can be uniquely identified using straightforward identification techniques, thereby removing the requirement of an additional cancellation code identification step disclosed in prior art U.S. Pat. No. 7,047,203 to Johnson (2006). This is discussed further in the operational description of the disarming process.

As a problem that has been solved before I shall describe a simple registration process, as in my currently preferred embodiment, although variations are possible such as a multi-stage application process, application by mail or email and manual data entry by a system operator, etc. All such variations and their equivalents meet the registration process requirements and are covered by the claims.

Figure 2:
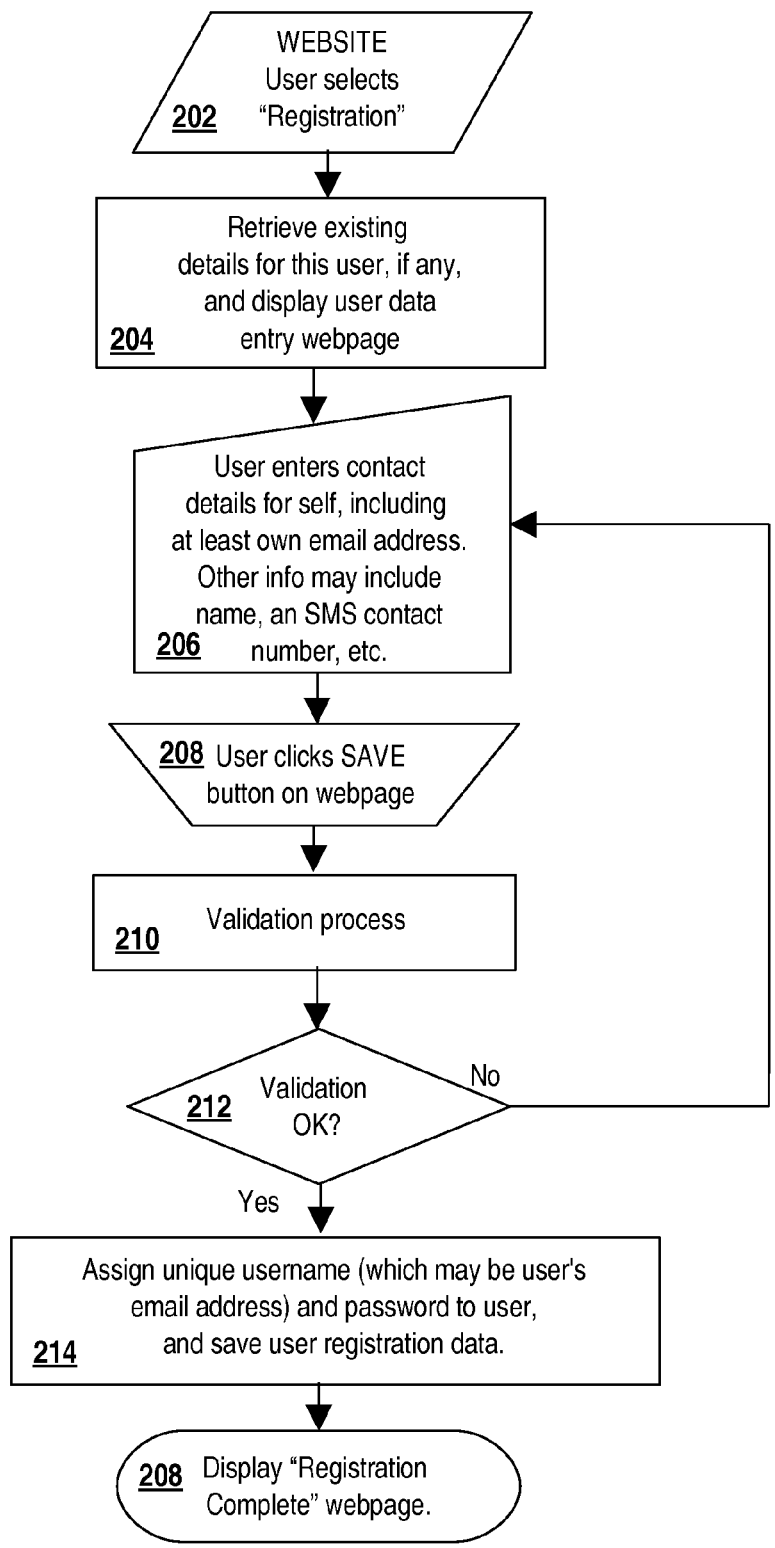
FIG. 2—User registration process, flowchart showing the steps involved in a user registering to use the system and being provided with a unique username and a password for identification purposes.

In this embodiment, as illustrated in FIG. 2, user 100 (from FIG. 1) visits the system website (not shown) using an Internet-connected device 102 (from FIG. 1) and selects a link, button or option 202 from a displayed webpage which causes the system to display to the user a webpage form 204, which allows the entry and submission of registration information from the user.

In step 206 user 100 then enters requested and required information into this webpage form. The information required includes at least an email address for the user, and may include other information such as the user's name and a preferred password. In this currently preferred embodiment the user's email address will be used as a unique identification code to identify the user. In other embodiments the user may be prompted to provide a unique identification code or username of his/her choice, or may be automatically provided with a unique identification code or username different from the user's email address. Additional information may be requested, such as gender and country of citizenship, which will assist in the provision of tailored and enhanced information to the contact person.

In some embodiments the user may also be prompted to provide a mobile messaging address such as, for example, the phone number of his/her mobile messaging capable cellphone or mobile phone 104 (from FIG. 1). In such embodiments the mobile messaging address may be used to identify the user when that user sends a text message using that mobile messaging device, and may be used by the system when sending text messages to the user.

In some embodiments the user may also be prompted to enter a specific password, or be assigned a specific password, to be used for identity validation when contacting the system via mobile messaging text message and other identity related information for this purpose.

Other embodiments may contain different methods to allow user 100 to provide his/her mobile messaging address. For example, this may be done in a separate webpage form on the system website, or may be done by the user sending a specific text command message to the system using mobile messaging device 104, such a message including, for example, the user's unique identification code (being an email address in my currently preferred embodiment) and password for identification and identity validation purposes. The user's mobile messaging address would then be extracted from the reply-address transmitted with the text message sent from the user.

When user 100 has finished entering data into the user registration form he/she clicks a submit button, link or option 208 which causes the entered information to be transmitted via Internet to the system.

A validation process 210 checks the submitted data for obvious errors, such as typographical errors in the email address. In some embodiments additional validation procedures may be carried out by the system such as, for example, sending an email to the user's specified email address and requiring the user to click on a link in that email, which acts as a confirmation that the user entered a valid, legitimate and correct email address.

Step 212 checks if validation process 212 has been completed successfully, in which case the system generates a unique reference code, which may be the user's unique identifier code, username or any other unique identifying label or code, which is used by the system to facilitate the storage and retrieval of any information associated with this user. The user's registration data is then stored associated with the user for later retrieval.

If all required steps in the registration process are complete then the system completes the user registration process by marking the database record containing the user's provided information as active, although in some embodiments it may be presumed to be active by its existence.

The final step in the registration process is to display a webpage 208 and/or send an email to user 100 which confirms that the registration process is complete.

To summarize the registration process of FIG. 2, at the end of the process the user has been assigned a unique identifying code or username, which may be his/her email address, and a password for identity validation. The system will also have a communications address for the user being, at a minimum, an email address. This information has been stored associated with the user for later retrieval.

As mentioned previously such a registration process is a common task in Internet based systems. My currently preferred embodiment described herein is one example of a method in which the user can access and complete a registration process using an Internet website, but it is obvious that the same could be achieved in other ways, such as the user posting or emailing an application form to the administrator of the system which is then entered manually or automatically by the system or an administrator thereof.

Figure 3:
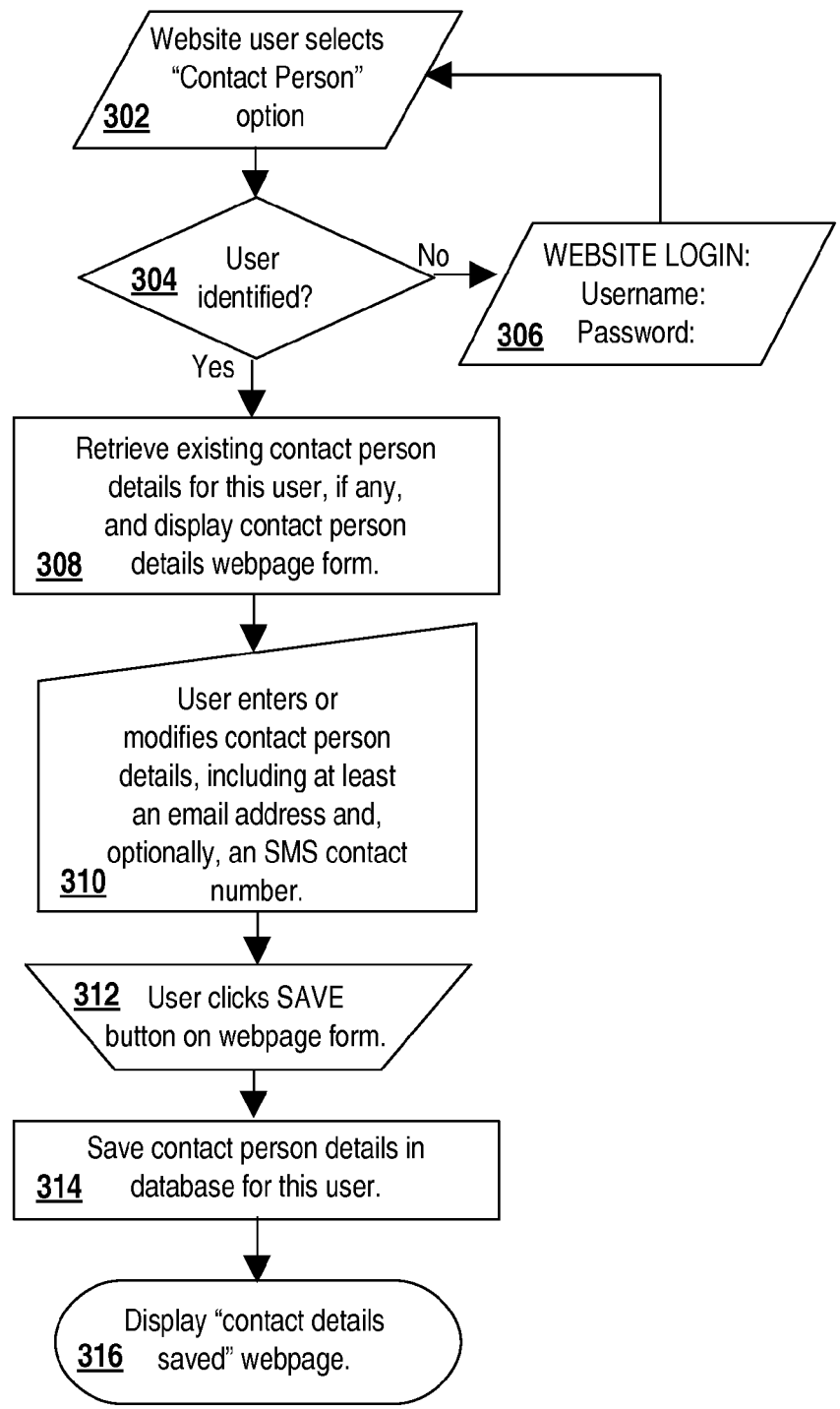
FIG. 3—Contact person data entry process, flowchart showing the steps involved in allowing a user to enter and save contact details for a contact person.

Contact Person Data Entry Process (114, FIG. 3)

The user is required to provide contact details for at least one contact person (130 from FIG. 1). Such a contact person will be the person notified by the system if the user fails to disarm the system before his/her alert time. Such a contact person will most likely be a friend, relative or colleague whom the user can trust to take follow-up action to locate the user should the need arise.

The contact person may also be, for example, a security service, an authority, a search and rescue organization or other such entity. In order to minimize the effects of false alarms caused by non-hazardous events, such as the user simply forgetting to disarm the system, it is considered preferable that the contact person be a private individual. A private individual nominated by the user should be considered by the user as trustworthy and resourceful enough to attempt to determine whether the notification received from the system is a false alarm, making his/her own attempts to locate the user, and involving the authorities in a search for the user should his/her own attempts to locate the user be unsuccessful. In any case, the minimum information required from the user about this contact person, be it a private individual or any other entity, is the provision of an email address for that person or entity.

It is, therefore, a necessary step prior to using the system as a whole that the user provide contact details for such a contact person. This task is handled by the system's contact person data entry process, as illustrated in FIG. 3.

In a currently preferred embodiment user 100 (from FIG. 1) accesses the contact person data entry process via the system website, accessible to the user using a standard web browser on an Internet connected computer or similar device 102. Step 302 shows that the user selects an appropriate link, button or option from the displayed webpage to access the contact person data entry process. As access to contact person data requires that the user has been identified (so that data to be entered or modified can be associated with the correct user) an identification check (step 304) is carried out prior to continuing. In the illustrated embodiment this consists of a check to see whether the user has already been identified and, if not, the login procedure (step 306) presents the user with a login webpage in which the user would enter his/her username and password.

In some embodiments login procedure 306 may complete the login process for the user either fully or partially automatically. An example of how this would be done would be the detection of a "cookie", which is standard Internet terminology for a small datafile stored on the user's computer by a website and which may subsequently, by a known process, be retrieved from the user's computer by the website. The contents of such a cookie may be sufficient to allow the website to re-identify the user's computer on subsequent visits without the requirement for the user to re-enter his/her username and password. Such variations are covered by the claims.

Once the user has been identified the system retrieves the previously stored unique reference code for the user to facilitate the storage and retrieval of specific data associated with the user. It then retrieves any existing contact person data for the user and displays it in a webpage form (step 308) to the user in his/her web browser. If the user has not yet entered any contact person details then a webpage form with incomplete data entry fields is displayed. If previously entered information is displayed the contact person data entry process allows existing information to be modified.

In step 310 the user enters at least an email address for at least one contact person. Additional data may be entered, such as a name, a telephone contact number, country of residence, timezone etc.

In some embodiments the user may be prompted for a mobile messaging address, typically the phone number of the contact person's SMS-capable mobile phone or cellphone, which would allow the system to send text messages to the contact person.

Once the user has entered the required data into the web form he/she clicks on an appropriate link or button in step 312 which causes step 314 to save or store this data in a database record associated with the user for later retrieval.

In some embodiments the user may be able to specify a contact person by sending an appropriately formatted mobile messaging text command message (not shown).

At the completion of this process step 316 displays a webpage to the user which confirms that his/her contact person details have been saved.

It will be recognized by the reader that variations to this process are possible which would achieve an equivalent result, that being that contact details for a contact person specified by the user are received by the system and stored associated with the user, available for later retrieval. All such variations are covered by the claims.

Figure 4:
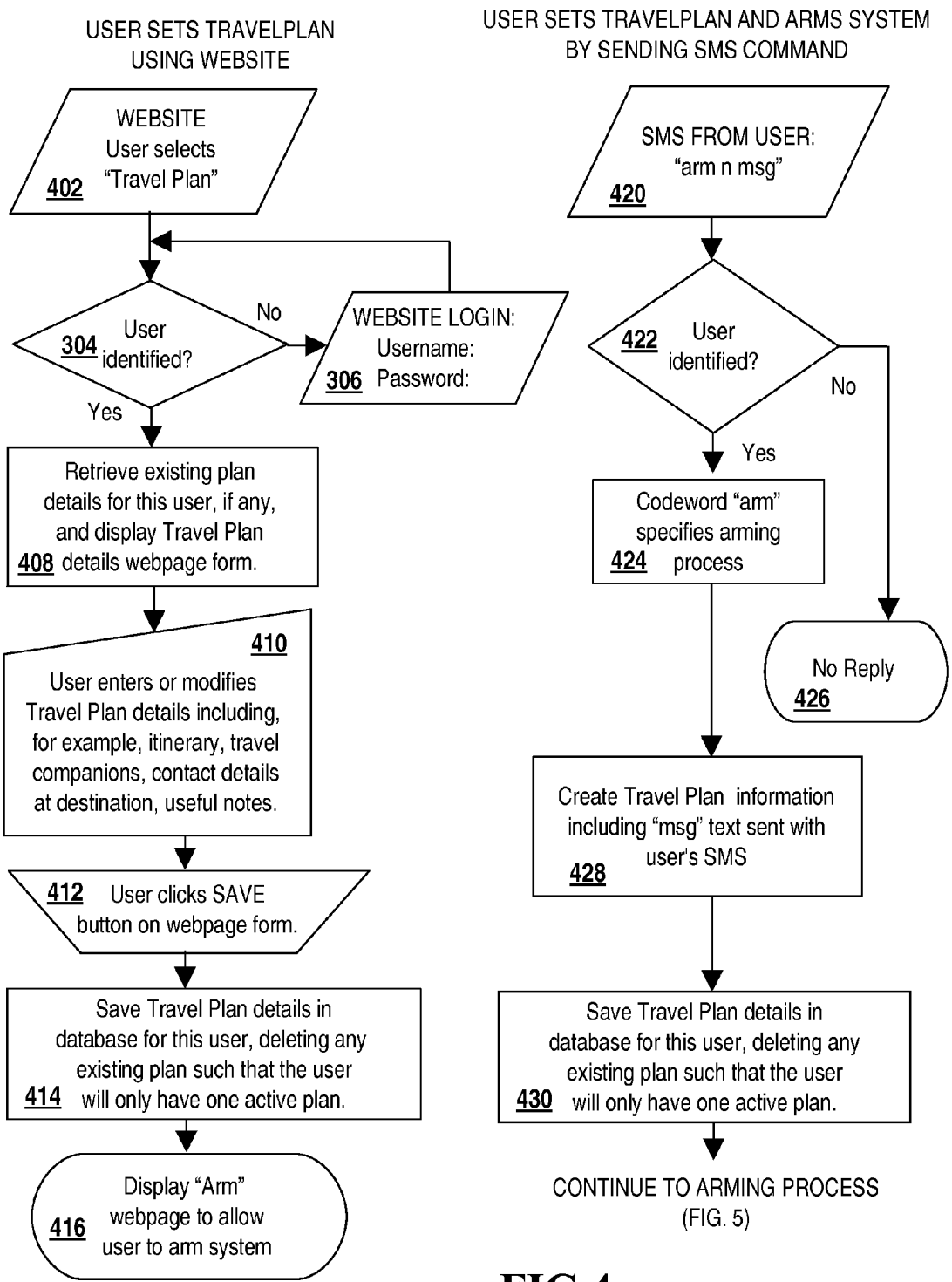
FIG. 4—Travel plan data entry process, flowchart showing the steps involved in allowing a user to enter and save a description of his/her travel plan.

Travel Plan Data Entry Process (116, FIG. 4)

After user 100 from FIG. 1 has completed registration process 112 and contact person data entry process 114 he/she may use other processes of the system to provide a travel safety notification function, the first of which will generally be travel plan data entry process 116.

The travel plan data entry process is illustrated in FIG. 4, and is the first step in the regular use of the system by the user. This process is used by the user to enter travel plan information for his/her proposed travel or excursion. Such information may include a brief description of the travel, a detailed plan or itinerary, proposed departure time and date, transport details such as travel company, and contact details for that company, flight numbers, names of traveling companions, additional comments thought relevant etc. The information requested by the system and provided by the user is intended to give contact person 130 sufficient information so as to be helpful in locating the user should the user go missing or be overdue from his/her travels.

The illustration of FIG. 4 includes a means of accessing the travel plan data entry process using the system website and, as included in my currently preferred embodiment, via mobile messaging text command message from the user to the system.

If using the system website the first step will be the user clicking on an appropriate website link, button or option (step 402). The system checks to see if the user has already been identified (step 304, being the same functional step as shown in FIG. 3) and, if not, presents the user with a login webpage (step 306, being the same functional step as shown in FIG. 3) requiring the entry of the user's username and password to continue.

Once the user has been identified the system retrieves the previously stored unique reference code for the user to facilitate storage and retrieval of specific data associated with the user. In step 408 a webpage form is displayed to allow the user to enter travel plan data. In some embodiments pre-existing travel plan data for this user, if it exists, may be retrieved and displayed in the form allowing the user to modify a previously used travel plan.

In step 414 the entered data is then stored associated with the user for later retrieval. Any pre-existing active travel plan data for this user will, at this point, be deleted and replaced with the current travel plan data such that each user will have only one active travel plan.

At the completion of this process step 416 displays a webpage to the user which indicates that his/her travel plan details have been saved and prompts the user to arm the monitoring process.

In some embodiments an alternate method of providing travel plan details is provided by way of a mobile messaging interface with the user. Using this method a user who has previously registered a mobile messaging address with the system may send a text command message or messages to the system to arm the monitoring process (122 from FIG. 1) and provide travel plan information. An example of this method is also illustrated in FIG. 4 (steps 420-430).

In the context of this disclosure a "text command message" is a text message sent from the user's mobile messaging device (104 from FIG. 1) to the system in a pre-defined format which may be determined by the system as a request by the user to carry out a particular procedure or process. This differs from a standard text message in that the particular content of the message, or the particular system mobile messaging address to which it is sent, is interpreted by the system as an instruction to carry out a particular process.

In my currently preferred embodiment the user may provide travel plan information and arm the system at the same time by sending a single text command message to the system, as shown in step 420. This text command message contains travel plan information and arming information, the arming information being described later.

Such a text command message will be sent by the user to an inbound mobile messaging address associated with the system and a delivery mechanism of known type which transfers such message to the Internet for delivery to the system. An example of this would be, as is used in the currently preferred embodiment, the provision of an inbound SMS contact number and the configuration of a service associated with that number such that inbound SMS messages are converted by that service into an Internet delivery format and then delivered via the Internet to the system. In my currently preferred embodiment the system has a single SMS contact number and the particular process requested by the user is determined by extracting a keyword representing that process from the text message. The actual message delivery pathway and method is immaterial so long as such text command messages are delivered to the system when sent to a specific inbound mobile messaging address associated with the system.

In other embodiments a particular inbound SMS number may be provided for a specific text command message type such that the particular process being requested by the user is determined by determination of which inbound SMS number was used by the user. In such embodiments a specific keyword within the message would not be required for determination of the function requested.

Mobile messaging formats other than Short Message Service (SMS) may be used to achieve the same functional results. For example, formatted email messages sent from an Internet-connected device, such as a BlackBerry device, are also considered a form of mobile messaging. Similarly, an "Instant Messaging" message format may be used. The term "mobile messaging", in the context of this disclosure, relates to any method or means of sending and/or receiving a message using a mobile or wireless device. Such variations are covered by the claims.

When SMS message 420 is received the system will attempt to identify the user (step 422) from information provided in or with the received message. In my currently preferred embodiment this is done by using the reply-address sent with the text command message. The reply-address is the mobile messaging address of the sender being transmitted with a sent message, such that the receiving party may send a reply to the sender at that address or phone number, and is analogous to the caller-id function of some telephone systems. If the user has registered his/her mobile messaging address (for example, his/her SMS contact number) with the system then this reply-address is sufficient to identify the user.

In some embodiments an additional password or other identification data may be required to be sent included in or with the sent text command message as a form of user validation.

For example, in some embodiments the user may send his/her username and password in the text command message, which would provide sufficient information to allow unique identification of the user without requiring the transmission and reception of a reply-address for the user. This would be useful if the telecommunications network in use by the user is not configured to allow transmission of reply-address information, if the user does not have his/her mobile messaging device configured to transmit the reply-address, or if the user is using a mobile messaging device which has not been previously registered with the system.

Should identification procedure 422 fail then step 426 shows the most likely response being to terminate the process without sending a reply to the sender of the message, although in some embodiments a reply may be sent to sender of the received message using the reply-address sent with the message, irrespective of the fact that the sender of the message has not been identified as a known user of the system. Such might be the case if the user is using a mobile messaging device other than the device which he/she has previously registered with the system. Such a reply message would inform of the identification failure and may request further identification information such as a username and password.

If the user has been identified then the system retrieves the previously stored unique reference code for the user to facilitate storing and retrieval of specific data associated with that user. The text command message contents are analyzed by the system in step 424. In the currently preferred embodiment the text in the message is parsed to extract a codeword which identifies the particular function requested by the user, and separates this from other information provided in the message.

In the case of the travel plan data entry process illustrated in FIG. 4 the user may send a combined travel plan data entry and arming message. This is illustrated by the example of a message including the codeword "arm" to specify the arming process, a numeric value represented by "n" used by the arming process (as described later), and appended travel plan text represented by "msg". In practice, "msg" would be replaced by the user with any text considered by the user to represent the user's travel plan, up to the text message length limit imposed by the mobile messaging system employed (for example, an SMS text message is generally limited to 160 characters). The presence of such appended data indicates to the system that the travel plan data entry process is to be carried out prior to the arming process, using the appended text as the travel plan data or as an addition to existing plan data.

In other embodiments the user may send additional text command messages or multi-part text command messages to overcome message length limitations imposed by a particular mobile messaging format. This would, in the SMS example, allow travel plan data to be provided by the user that is longer than would otherwise be possible due to the SMS 160 character limit.

Although a specific example of an "arm" text command message is illustrated the actual format of this text command message may differ, so long as the system can determine that the travel plan data entry and arming processes have been requested. All such variations in message format are covered by the claims.

In the illustrated example (FIG. 4), if the message contains appended text the system interprets this as a requirement to carry out the travel plan data entry process prior to arming the system using that appended text as travel plan information. In step 428 such information is extracted from the text command message and a travel plan is created which includes this extracted text.

Step 430 stores the created travel plan associated with the user for later retrieval. In my currently preferred embodiment any preexisting active travel plan is deleted or replaced, however in other embodiments the newly provided travel plan data may be appended to existing travel plan information. In any case, at the completion of the travel data entry process the user will have one active travel plan.

Figure 5:
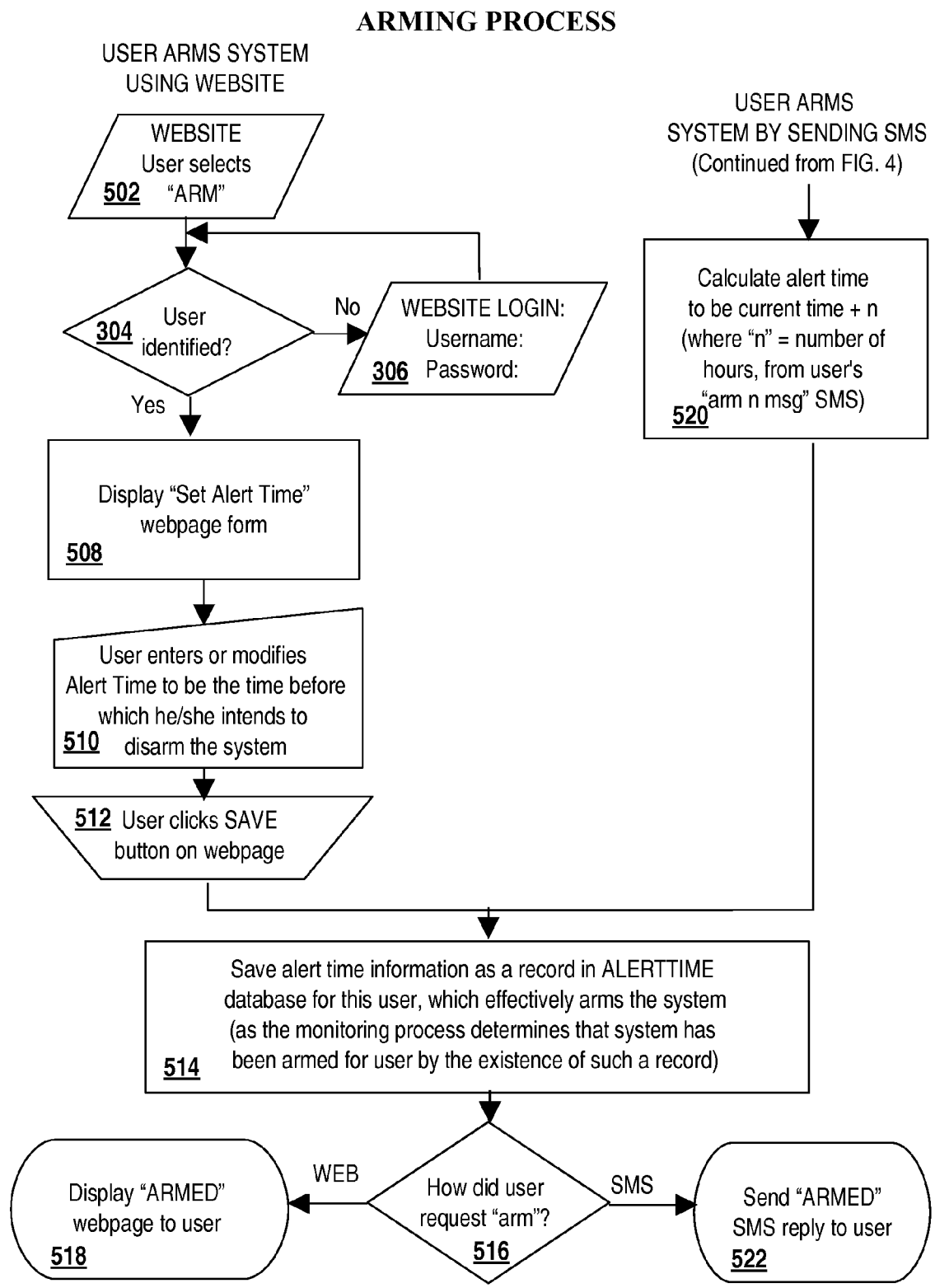
FIG. 5—Arming process, flowchart showing the steps involved in allowing a user to enter an alert time, save that time, and arm the monitoring process.

As the described SMS command message is a combined command which provides travel plan information and arms the system, the description of what happens after step 430 is continued in the discussion of FIG. 5, the arming process, in the next section.

In some embodiments additional information may be appended to the saved travel plan data by the user who, to achieve this task, would send an appropriate text message command (not shown) to the system using mobile messaging device 104 (from FIG. 1). An example of this would be the sending of a position update, such as a GPS position or a text description of location such that, read in conjunction with the user's saved travel plan, a searcher may see that the user had at least reached a certain point in his/her itinerary, thereby allowing the search to concentrate on the remaining itinerary locations or routing. Depending on the device and communications network capabilities, position information may be sent in the message body or sent along with the message, either specifically included or provided automatically by the device and/or communications network.

As an alternative to, or in conjunction with, such a position update, the user may wish to simply append an additional text description. Such a description might be to describe a change to the originally submitted travel plan, or to enhance the original itinerary, such that the additional information would better assist a searcher in locating the user should the need arise.

Such position update or appended text may be saved in the same data record as the travel plan data or in its own separate data record stored associated with the user, the storage method being immaterial as, in any case, such position update or additional text would be made available along with the travel plan data to the contact person after expiry of the user's alert time.

In other embodiments various methods of data entry may be included for the website entry of travel plan data, such as text data entry, selection of displayed options, or selection of items from displayed lists.

Alternate data entry methods for provision of itinerary or route description information may be included. In another embodiment a route plan may be created by the selection or creation of positions or waypoints from, or with reference to, a displayed map, satellite image or aerial photograph (or composites thereof), with the route data so created being provided to the travel plan data entry process. This graphical means of data entry may be provided by the described system itself or a by a third party website, with the route data made available for inclusion by the described travel plan data entry process.

In another embodiment upload to the described system of a waypoint routeplan or flightplan from a GPS device (not shown) or data upload from a route planning program (not shown) is another means of providing the travel plan data entry process with a route or itinerary description.

In some embodiments special use data may also be entered, such as a vehicle description, safety/emergency equipment carried and any relevant special training or skills possessed by the traveler or his/her traveling companions. After entering information relevant to the user's upcoming travel that information is stored associated with the user for later retrieval.

Someone skilled in the art may create a database structure or a travel plan data entry process with a different structure but which performs an equivalent role. Such variations within the scope of the claims.

Arming Process (118 and FIG. 5)

Once user 100 from FIG. 1 has set an active travel plan he/she may arm the system. The operation of the system is such that user 100 provides an alert time or interval to the system which, by means of arming process 118, activates or arms monitoring process 122. The alert time specified by the user will be the time by which that user expects to have contacted the system again to confirm his/her safety. In other words, it is the time by which the user expects to have safely completed his/her trip, journey or excursion and contacted the system to disarm using disarm process 120, which will terminate monitoring of that user by monitoring process 122.

FIG. 5 illustrates an embodiment of the arming process which, like the travel plan data entry process, can be performed by user 100 by using the system website accessed via an Internet-connected device 102 or by sending a text command message to the system from the user's mobile messaging device 104.

Firstly describing the website method, step 502 shows the user selecting a link, button or option on the system website which consequently leads the user to the arming process. Steps 304 and 306 (being the same functional steps as shown in FIG. 3) perform the task of identifying the user and are as described in the description of the contact person data entry process above.

After identity confirmation the user is presented with a webpage form (step 508) which allows the user to enter an alert time, being a time in the future at which the system will initiate a notification process if the user has not disarmed the system. This alert time may be specified in terms of a time, or a combination of date and time. In another embodiment the alert time may be specified as a time interval, the alert time being a time in the future as determined by the specified time interval. For example, the user may specify "alert time expiry in 6 hours". In some embodiments the alert time so entered will be rounded to the next whole hour, or part thereof, for design simplicity and to make the resultant alert time easier to remember. For example, "7.00 pm" is easier to remember than "6.53 pm".

In step 510 the user enters an alert time and, as shown in step 512, clicks a submit button, link or option to indicate completion of data entry and to save the entered data.

Step 514 causes the data to be stored associated with the user for later retrieval. This is accomplished by saving the alert time information in a record in a database which, for the purposes of this description, is referred to as the "ALERT-TIME" database. The ALERTTIME database contains records of saved alert times each associated with an individual user.

In my currently preferred embodiment it is the presence of an ALERTTIME database record for any individual user which indicates to monitoring process (122 of FIG. 1) that the system is armed for that user. Thus, in this embodiment, no discrete arming step is required. That is, it is the saving of the alert time as a record in the ALERTTIME database which effectively arms the system.

In other embodiments the system may include variations in which an alert time is saved for a user but the system is not armed for that user until the user specifically arms the system using a separate step. Such separate steps may be accomplished via the website or as a combination of website usage and text command messages. All such variations are covered by the claims.

It will be recognized by those skilled in the art that there are different ways to structure databases and their database records, and therefore that there are different ways of saving an alert time and indicating to the system that the system is armed for a particular user. All such methods are covered by the claims.

Steps 516 and 518 show that after the alert time data is saved for the user which, in the currently preferred embodiment, arms the system, the user is presented with a webpage which indicates that the system is now armed for that user.

As previously mentioned, the system may also be armed by the user sending a text command message, such as an appropriately formatted SMS message, from the user's mobile messaging device 104 (from FIG. 1). The illustration of this process commenced in FIG. 4 showing an SMS "arm" command from the user (steps 420-430 from FIG. 4) in which the user was identified and the included travel plan data was saved for the user. Continuing now to FIG. 5, in step 520 the arming process calculates an alert time based on information included in text command message 420 sent by the user to the system. In this example the alert time is specified by including in sent message 420 a number "n" which may be any number representing a number of hours from the present time.

In another embodiments the user may include in sent message 420 alert time information in a different format, for example as a time format including hour and minute values or as a format including date, hour and minute. All variations in time format are covered by the claims.

Once this time calculation has been performed step 514 saves the user's alert time as a database record associated with the user in the ALERTTIME database, as described for the website accessed arming method above.

In my currently preferred embodiment the time reference used for all time calculations is Universal Coordinated Time (UTC) or Greenwich Mean Time (GMT), however any time reference may be used so long as it is used consistently. Time values may also be used or displayed by the system referenced to the user's current location or timezone, a planned destination timezone based on travel plan data, or any other timezone reference. All such variations are covered by the claims.

As for the arming method, other embodiments include methods in which the system may be armed separately from the provision of the alert time, or from the provision of travel plan data, such that these tasks may be accomplished by separate text command messages or as a combination of website usage and text command messages. All such variations are covered by the claims.

Steps 516 and 522 cause the user to be sent a mobile messaging text message, such as an SMS message, indicating that the system has been armed and which may include the alert time by which the user must disarm the system.

In my currently preferred embodiment the alert time displayed to the user includes a version of the alert time in the user's own local time or the local time at the user's planned destination as specified in the user's travel plan. The alert time may also be displayed in UTC or GMT, which may be preferable for certain user groups (for example, aviators or others who regularly use UTC as a time reference).

For the calculation of times referenced to the user's location (the user's local time) the system may need to apply a time correction to the time based on the system's reference timebase. The user's current timezone may be determined by the user advising the system of his/her current location, state or province, or actual timezone, using the system website or by mobile messaging text command message, or determined by other means. Examples of other means include the system deducing the user's location or timezone based on the Internet IP (Internet Protocol) address used by the user when accessing the system website, or by local time, location or timezone information sent with or in a text command message. In the case of the provision or deduction of the user's location, timebase correction values may be extracted from a time reference/location database, lookup table or some other function, or by mathematical calculation, the actual method being immaterial so long as it comes up with the right answer.

Various embodiments of the invention therefore contain processes (not shown) for the system to be informed or to deduce the user's timezone, to facilitate the provision of time information in local time for the individual user.

Someone skilled in the art may create an arming process with a different structure but which performs an equivalent role. Such variations are covered by the claims.

Figure 6:
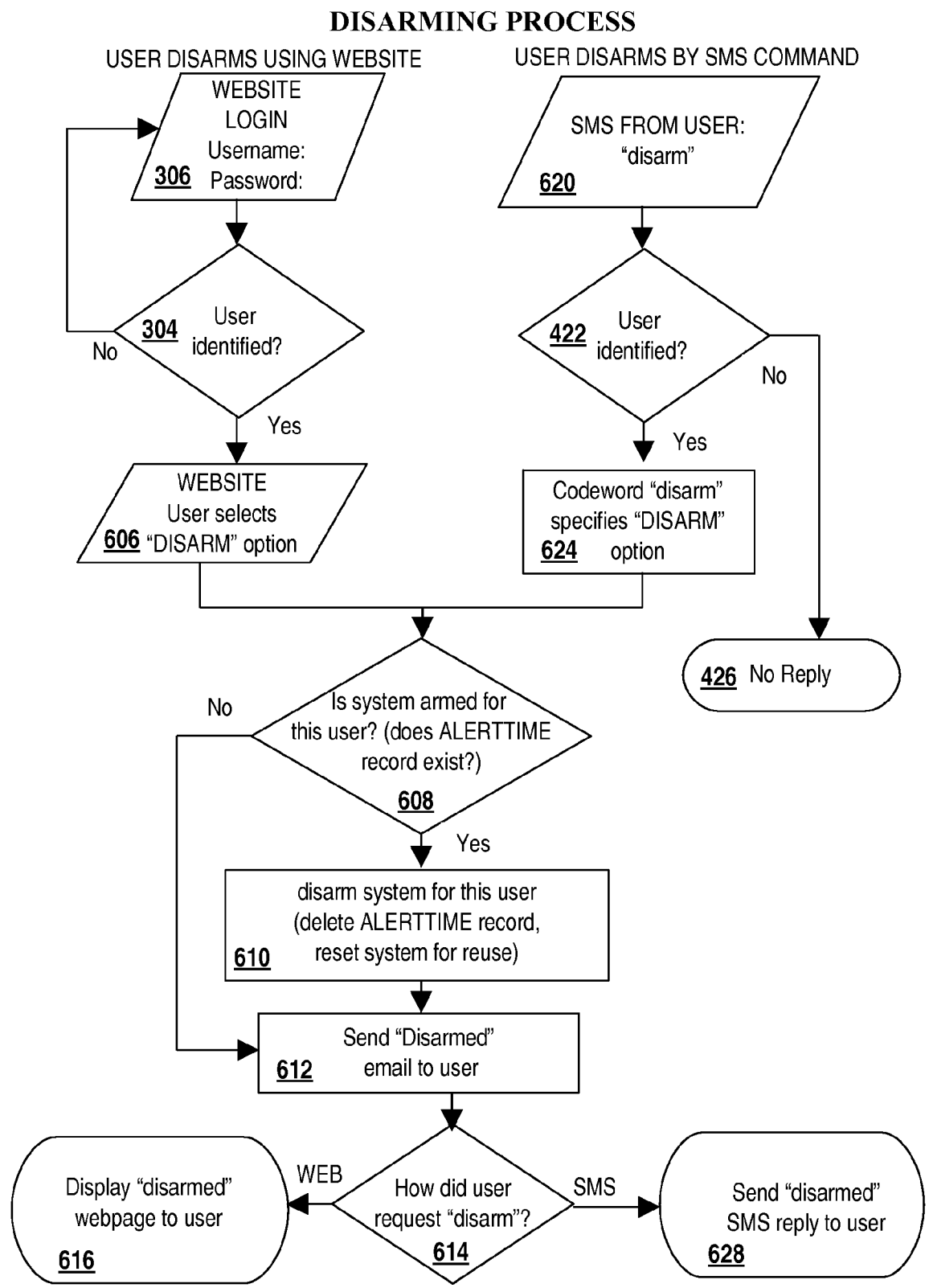
FIG. 6—Disarming process, flowchart showing the steps involved in allowing a user to disarm the monitoring process.

Disarming Process (120 and FIG. 6)

Once user 100 from FIG. 1 has saved a travel plan and armed the system by saving an alert time the system is armed. This means that monitoring process 122 (described in the next section) has commenced monitoring for that user. If the user fails to disarm the system before his/her alert time then the monitoring process triggers notification process 124, also described later, which will alert contact person 130.

It can be seen, therefore, that in order for the user to prevent an alert to his/her contact person that user 100 must disarm the system prior to his/her alert time, which is accomplished using disarming process 120. The disarming process, once completed, terminates or suspends monitoring by monitoring process 122 for that user.

In the currently preferred embodiment this process may be accessed by user 100 (from FIG. 1) via the system website using an Internet-connected device 102 (FIG. 1) or by sending an appropriate text command message from the user's mobile messaging device 104 (FIG. 1).

Referring now to FIG. 6, which illustrates the disarming process, the website access method is shown commencing with steps 306 and 304, which are the login and identification procedures for identifying the user as previously described (these are the same functional steps as described in the contact person data entry process description and shown in FIG. 3).

Once the user is identified the user selects, in step 606, a link, button or option from the website which takes him/her to the disarming procedure. It should be noted FIG. 6 differs from FIGS. 3-5 in that the login procedure is shown as occurring before the user selects the disarm option. This is because, in my currently preferred embodiment, the user must login and be identified before being presented with the option to disarm the system (as the armed/disarmed status of the system for the user cannot be determined or displayed to the user until the user has been identified).

In other embodiments the user may select a disarm option before the login procedure, in which case he/she will be identified or presented with the login procedure. In other words, step 606 may precede steps 304 and 306 in a similar manner to that illustrated in FIGS. 3-5.

Step 608 determines whether the system is actually armed for the user by searching for the presence of an ALERT-TIME record for the user, as this is the database and procedural method chosen for my currently preferred embodiment. As mentioned previously, however, other methods of data management exist and would be suitable in indicating that the system is in the "armed" state.

If the system is actually armed then step 610 shows that the system performs a disarm operation. In my currently preferred embodiment this would be carried out by deleting the ALERTTIME record for that user, as it is the presence of such a record which indicates the armed state to the system.

Step 612 shows that the system would then send an email message to the user confirming to the user that he/she has successfully disarmed the system. The sending of such an email message provides electronic written evidence to the user of the system state. Similarly, if the system was not armed in the first place, as determined by step 608, an email message may still be sent to the user confirming that the state of the system is disarmed.

The process concludes with steps 614 and 616 resulting in a webpage being displayed to the user confirming the disarmed state of the system.

If the user elects to disarm the system by sending a text command message, such as an appropriately formatted SMS text message, he/she would send a message to the system as shown in step 620. For example, such a text command message may contain the codeword "disarm" to indicate to the system that the disarming process is requested by the user. The user identification procedure (step 422) and the identification failure response (step 426) are as described previously in the travel plan data entry process description and FIG. 4.

Step 624 shows that, in the illustrated example, the system would determine the actual process requested by the sent text command message by the presence of a particular codeword in the text message, such as the word "disarm" in this example. Although a specific example of a disarm text command message is illustrated the actual format of this text command message may differ, so long as the system can determine that the disarming process is being requested. All such variations in text command message format are within the scope of the claims.

As in the website access description above, steps 608-612 result in the system being disarmed for this user by the deletion of the ALERTTIME record associated with this user. This also resets the system for subsequent reuse by the user.

If the user had accessed this process by sending a text command message (such as an SMS text command message), steps 614 and 628 result in a text message reply being sent to the user's mobile messaging device 104 (from FIG. 1) indicating that the system has been disarmed.

After disarming the system the process of using the system to monitor the user's travel plan is complete. The user may reuse the system by entering a new travel plan and a new alert time (thus arming the system again) as and when he/she wishes.

As described in the descriptions of travel plan data entry process 116 and arming process 118, only one active travel plan and only one alert time is saved for any individual user. Due to the user having only one alert time there will only ever be one monitoring process active for any individual user. Therefore the identification of the itinerary, alert time, and monitoring process for any individual user only requires the successful identification of that user. No additional information is required to select between multiple travel plans or alert times for that user because such multiple records do not exist. Thus an additional "cancellation code", as required by Johnson in U.S. Pat. No. 7,047,203, is not required or used.

It can be seen by this description of the disarming process that it is a simple process, requiring only the successful identification of the user and an expression by the user of a desire to disarm the system (for example, by selecting "disarm" from the website or by including the codeword "disarm" in an SMS text command message to the system).

Someone skilled in the art may create a disarming process with a different structure but which performs an equivalent role. Such variations are covered by the claims.

Figure 7:
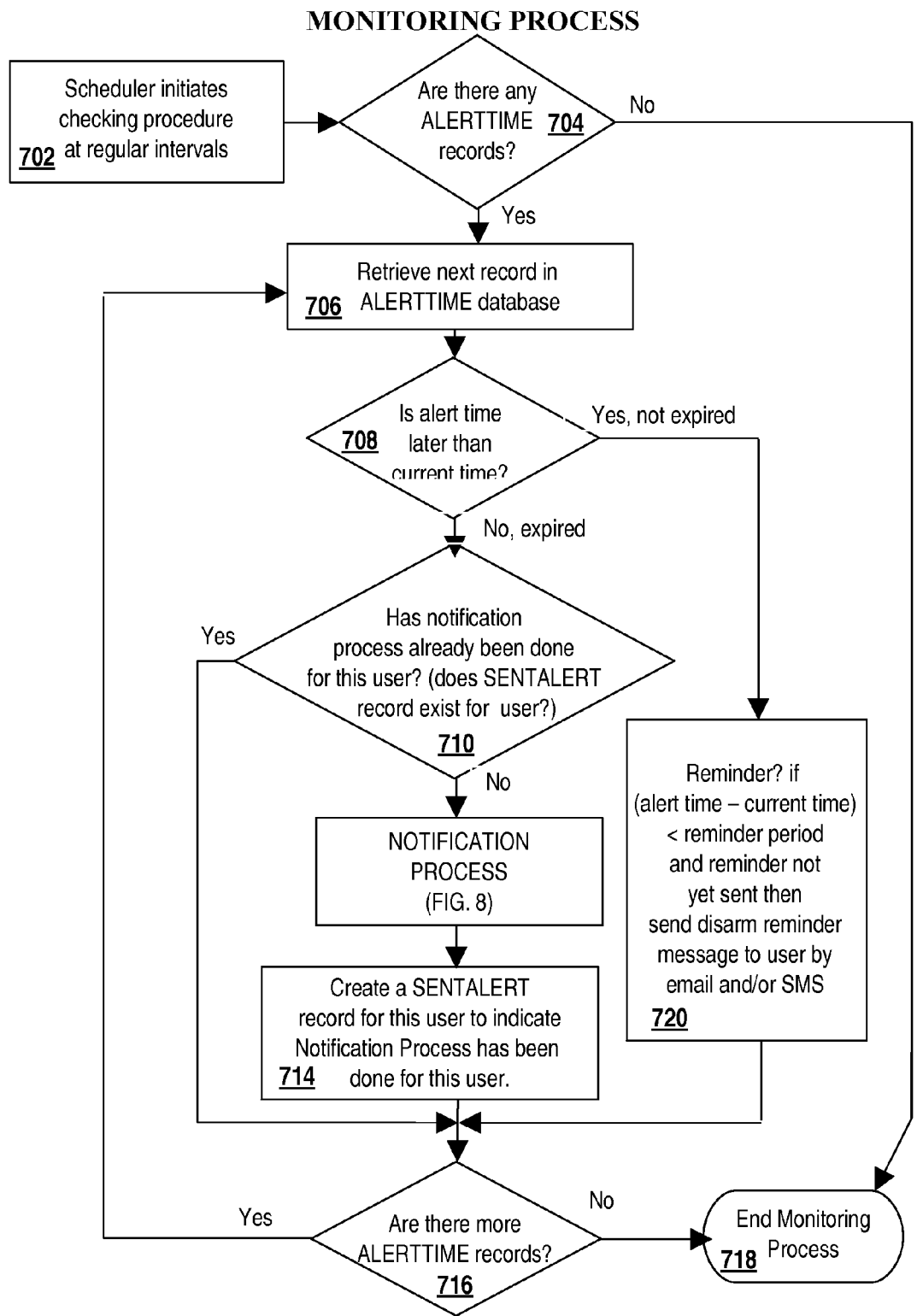
FIG. 7—Monitoring process, flowchart showing the steps involved in monitoring the alert times of all users who have armed the system, and initiating the notification process should an alert time pass without having been disarmed by the user or on receipt of an emergency activation message.

Monitoring Process (122, FIG. 7)

The monitoring process (122 in FIG. 1) is the part of the system which checks whether any user has armed the system but failed to disarm it prior to his/her alert time. If this is determined to be the case then the monitoring process calls notification process 124, which is described in the next section.

FIG. 7 illustrates the operation of the monitoring process. This process is periodically initiated by a scheduler (step 702) which automatically and at predefined intervals starts the monitoring process proper. The actual interval between scheduler initiation events is immaterial but is of sufficient frequency that expired alert times are acted on by the monitoring process shortly after their expiry.

In another embodiment scheduler 702 may initiate the monitoring process at irregular intervals predetermined by, or in response to, existing alert times in the ALERTTIME database.

Once started by the scheduler, step 704 checks whether there are any records in the ALERTTIME database. As previously mentioned, when a user arms the system a record containing the alert time associated with that user is saved in the ALERTTIME database and when that user disarms the system that record is deleted. Thus if any of the system's users have armed the system but have yet to disarm it there will be a record in the ALERTTIME database for each such user.

If step 704 determines that there are no ALERTTIME records then none of the system's user's has an active alert time so the monitoring process terminates with step 718. The monitoring process then does not restart until initiated again by scheduler 702.

If there is at least one record in the ALERTTIME database then step 706 retrieves one record from that database. In step 708 the alert time stored in that record is checked to determine whether the alert time has expired, meaning that the alert time has passed.

If the alert time in that record is later than the current time then the alert time has not yet expired. In some embodiments a further check is made by step 720 to see if the alert time will soon expire. In such embodiments a reminder period value may be set such that the user is sent a reminder message shortly prior to his/her alert time expiry as a reminder to disarm the system. This feature is a means of minimizing the occurrence of false alarms due to forgetfulness on behalf of the user. In step 720 if the current time is within the reminder period of the alert time then a reminder message would be sent to the user by email and/or text message to the user's mobile messaging device (if such a message has not already been sent).

After step 720 processing is complete for the current ALERTTIME record so processing proceeds to step 716, which determines whether there are other records in the ALERTTIME database which require checking.

In other embodiments reminder function 720 is not provided. In that case, non-expiry of the alert time determined by step 708 would result in proceeding directly to step 716.

If step 708 determines that the alert time has expired the process continues to step 710, which determines whether an alert has already been sent out for this user and expiry event. If the answer to this question is yes then no further processing is carried out for this user and the process continues to step 716, which determines whether there are further records in the ALERTTIME database which require checking.

If, however, the notification process has not yet been called for this user's alert time expiry event then notification process 124 (from FIG. 1) is called. The notification process is described in the next section. After the completion of the notification process for the current user the monitoring process continues to step 714, which creates and stores a record associated with this user in a separate database. For the purposes of this description, that database is referred to as the "SENTALERT" database. The presence of a record in the SENTALERT database for a user indicates to the system that the notification process has been performed (meaning that an alert has been sent to contact person 130 of FIG. 1 and notification information prepared for notification website 126) for that user and expiry event.

This completes the processing for the current ALERTTIME record. The monitoring process then proceeds to step 716 which determines whether there are remaining ALERTTIME records which require checking. If this is the case then the process returns to step 706 where the next alert time record is retrieved from the ALERTTIME database and processed as described above.

When step 716 determines that there are no remaining ALERTTIME records to be checked then the monitoring process is terminated at step 718 until the next time the process is started by scheduler 702.

Someone skilled in the art may create a monitoring process with a different structure but which performs an equivalent role. Such variations are within the scope of the claims.

Figure 8:
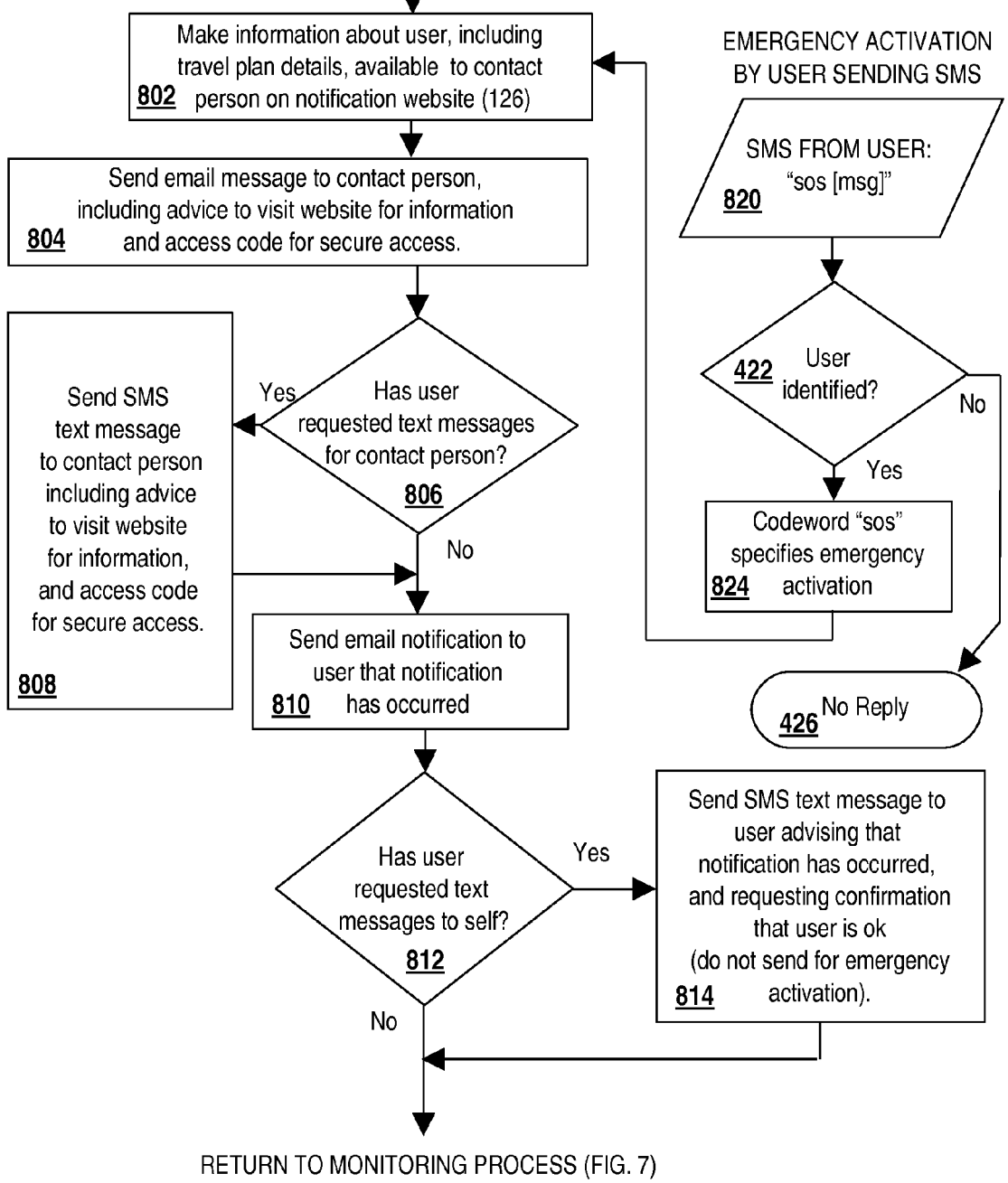
FIG. 8—Notification process, flowchart showing the steps involved in notifying a contact person should the user's alert time have passed without having been disarmed.

Notification Process (124 and FIG. 8.)

It is considered important in the design of the system that information be provided to the contact person in a form helpful when enlisting the assistance of the authorities. To this end a primary goal of the invention is to provide information about a missing user in a secure electronic written format so that the contact person will receive clear, unambiguous information which can be shown to the authorities.

Additional benefits of written notification over verbal notification are the elimination of transcription or recollection errors by the contact person and the minimization of misinterpretation.

For these reasons it is a key goal of the invention that notifications are provided in a written format. To avoid the lack of security in email transmissions the primary display of user data (personal and travel plan information) is on a notification website accessed by contact person 130 using an Internet-connected device 132, a copy of which may be printed by the contact person for ease of reference and ready provision to the authorities should that be deemed appropriate.

If monitoring process 122 from FIG. 1 determines that the alert time for a user has expired without the user having disarmed the system then notification process 124 is initiated for that user. The primary purpose of the notification process is to inform contact person 130 that user 100's safety is in doubt and to provide that contact person with information regarding the user's travel plan. To achieve this contact person 130 is sent an alert via email viewable on an Internet-connected device 132 and/or via a text message to mobile messaging device 134. This alert will contain access details (such as a website address and/or link and, in some embodiments, a unique access code) for notification website 126. Contact person 130 can then use these access details for full information about the missing user via notification website 126.

FIG. 8 illustrates the operation of the notification process in my currently preferred embodiment. When called by the monitoring process of FIG. 7 in response to the detection of an expired alert time, step 802 of the notification process makes information about the user and his/her travel plan available on notification website 126 (from FIG. 1) such that the user's contact person can access it. Other useful information may also be provided, such as a detailed description of all information known about the user, his/her current travel plan, last known position, a copy of past travel plans, access logs including Internet IP addresses used when accessing the website (which may imply an approximate location of use), actual time and method of last access (website or mobile messaging), any of which may provide valuable clues in a search. Generic and geographically or user tailored additional information, such as contact telephone numbers for police, other authorities or search-and-rescue organizations may also be provided. The notification website is discussed in more detail later.

In other embodiments enhanced information provided to contact person 130 (from FIG. 1) via website 126 (from FIG. 1) may include be a display of user 100's last known position and/or planned route overlaid on a map, or aerial or satellite image, relevant information regarding the search area (such as current and forecast weather, political or civil unrest updates, natural disasters, breaking safety related news events etc.), carried equipment descriptions and capability estimates etc. Suggestions for the best course-of-action based on past results in similar situations and other parameters, and/or generic course-of-action guidelines or suggestions may be displayed. In some embodiments a user-reliability rating for user 100 may also be displayed, based partly on the user's history of false alarm events.

In the currently preferred embodiment the availability of user-specific information on notification website 126 (from FIG. 1) is restricted to access by the user's contact person and any such person, authority or entity as the contact person may enlist. This is done by the provision of a unique access code to the contact person which will allow access to such restricted data. Access to this data is allowed during the alert phase, which ends when the user confirms his/her safety using safety confirmation process 128 (from FIG. 1). This means that the restricted information is made available to the contact person during the period of uncertainty regarding the user, being the period from activation of the notification process (when the user's alert time has expired or an emergency activation message is received from the user) up until the user confirms that he/she is safe. If access is denied to the contact person due to the safety of the user having been confirmed (using the safety confirmation process described later) the contact person will be made aware of this fact. In another embodiment access for contact person 130 (from FIG. 1) to notification website 126 (from FIG. 1) may be allowed by the user at times other than just during the alert phase.

In some embodiments, contact person 130 (from FIG. 1) may need to provide additional identity confirmation information to gain access to website 126 (from FIG. 1). An example of this would be the provision of his/her email address, and/or a correct response to a question and answer predetermined by the user during contact person data entry process 114 (from FIG. 1).

Step 804 of the process then sends an alert by email to contact person 130. This email message includes advice to visit notification website 126 (from FIG. 1) urgently, and access details for that website.

In the preferred embodiment the user may have, when entering the contact details for a contact person using contact person data entry process 114 (from FIG. 1), provided a mobile messaging address for the contact person's mobile messaging device 134 (from FIG. 1), such as a SMS contact number. The user may also have requested that text message alerts be sent to that contact person. If step 806 determines this to be the case then step 808 sends an alert by text message to device 134 (from FIG. 1), which includes access details for notification website 126 (from FIG. 1) and provides access details for that website. The purpose of this text message is to prompt the contact person to seek information as soon as possible rather than waiting until the next time the contact person happens to be checking his/her emails.

It should be noted that the user's travel plan details are not sent in the text message to the contact person's mobile messaging device. The text message prompts the contact person to seek this information from website 126 (from FIG. 1). The text message to the contact person does not, therefore, represent "notification" of all available information to the contact person, rather being an "alert" to the fact that information is available to be retrieved elsewhere.

To advise user 100 that alert notification has occurred an email message is sent to user 100 in step 810. This email may also include advice to the user to get in touch with contact person 130 as soon as possible, in order to allay his/her fears for the user's safety.

In currently preferred embodiment step 812 determines whether user 100 has requested mobile messaging text messages be sent to himself/herself by the system. If this is the case then step 814 sends a text message to the user (to device 104 of FIG. 1) advising that alert notification to contact person 130 has occurred. Such a text message may also contain advice to get in touch with contact person 130 as soon as possible. In these embodiments the text message to the user may also contain instructions on how to confirm, by text command message to the system, the safety of the user. This safety confirmation process (128 from FIG. 1) is described in the next section.

In another embodiment an "Instant Messaging" alert may be sent to contact person 130. Instant messaging is a form of brief message transmission which causes immediate notification to the recipient if he/she is using an Internet-connected device properly configured to receive such messages. Such an embodiment includes receiving and storing instant messaging address details from user 100 for contact person 130 as part of the contact person data entry process 114 (of FIG. 1).

In some embodiments the notification process may be activated prior to the expiry of the alert time for user 100 if the safety of that user is in doubt. An example of the cause of such doubt may be the receipt by the system of a text command message from the user requesting immediate activation of the notification process. This is illustrated in FIG. 1 by the dashed line joining mobile messaging device 104 with notification process 124. Referring again to FIG. 8, this may be done, for example, in response to the receipt of an "SOS" SMS command message (step 820), indicating that the user is in immediate or imminent danger. The user identification procedure (step 422) and the identification failure response (step 426) are as described previously in the travel plan data entry process description and FIG. 4.

Step 824 shows that, in the illustrated example, the system would determine the actual process requested by the sent text command message by the presence of a particular codeword in the text message, such as the word "sos" in this example. Although a specific example of an emergency activation command message is illustrated the actual format of this text command message may differ, so long as the system can determine that emergency activation of the notification process has been requested.

In another embodiment a specific emergency activation inbound mobile messaging address would be provided, with a user request for emergency activation being determined by the fact that the inbound message has been received by that particular mobile messaging address. In this case the message text need not contain any text at all, and the user can activate the "sos" function by sending a message to that specific address. This would have the benefit to the user of allowing him/her to save the "sos" number in the memory of his/her mobile messaging device. To request emergency activation the user need simply, for example, send a blank message to the "sos" number saved in his/her mobile phone or cellphone. Such a variation is covered by the claims.

Additional text may be sent with the "sos" text command message, with such additional text represented by the optional "[msg]" part of the SMS command message of step 820. If such additional text is included it will be appended in the notification to contact person 130. Additional information may thus be provided by the user at the time of activation.

Upon determination that the received text command message is a request for emergency activation processing proceeds to step 802, thus commencing the notification process as previously described.

In some embodiments emergency activation will activate the notification process irrespective of the current armed/disarmed status of the system. Thus, if the system is currently not armed the system would respond as if it had been armed, with a brief travel plan record being constructed for the user by the system. Such an travel plan would include any additional text included in the "sos" text command message any may also include other relevant information about the user available to the system.

In such embodiments incorporating an SOS feature the normal text message response to the operation of the notification process (step 814) may be inhibited so as to eliminate a text message reply to the user. The reason for this is so as not to place the user in greater danger by the possibility of the "message received" alert noise made by many mobile messaging devices when they receive a new message. Such alert noises can be quite loud and the receipt of a message from the system may attract unwanted attention to the user. Thus the user may initiate an emergency activation of the notification process without fear of a noisy reply from the system. In this case the user could request confirmation from the system that the SOS command had been received by sending a "status" text command message to the system (not shown), which would elicit a confirmation response from the system.

In some such embodiments the receipt of an "SOS" text command message may initiate a notification process in which, for example, additional contact persons, authorities or other entities may be notified (not shown). Some or all of these additional contact persons or entities may be selected on the user's behalf by the system. An example of this would be where the system determined that a notification to a local police force was appropriate, even though the user had not specifically entered that police force as a contact person or entity. This step may be taken due to the fact that, as a directed request for emergency activation has been received from the user, the chances of a false alarm are greatly reduced when compared with the alert time expiry activation method, and immediate or imminent danger to the user is implied by his/her use of the SOS text command message.

In other embodiments such additional notification may be made to an additionally entered or selected contact person or entity, entered or selected by the user as an additional contact person but specified by the user to be notified by the system only in the event of emergency activation by use of the SOS text command message method (not shown). That is, such an additional contact person or entity would not be included in the standard notifications activated by the expiry of an alert time but would be included for emergency activation.

Those skilled in the art may construct a different notification process which performs an equivalent role. Such variations are covered by the claims.

Figure 9:
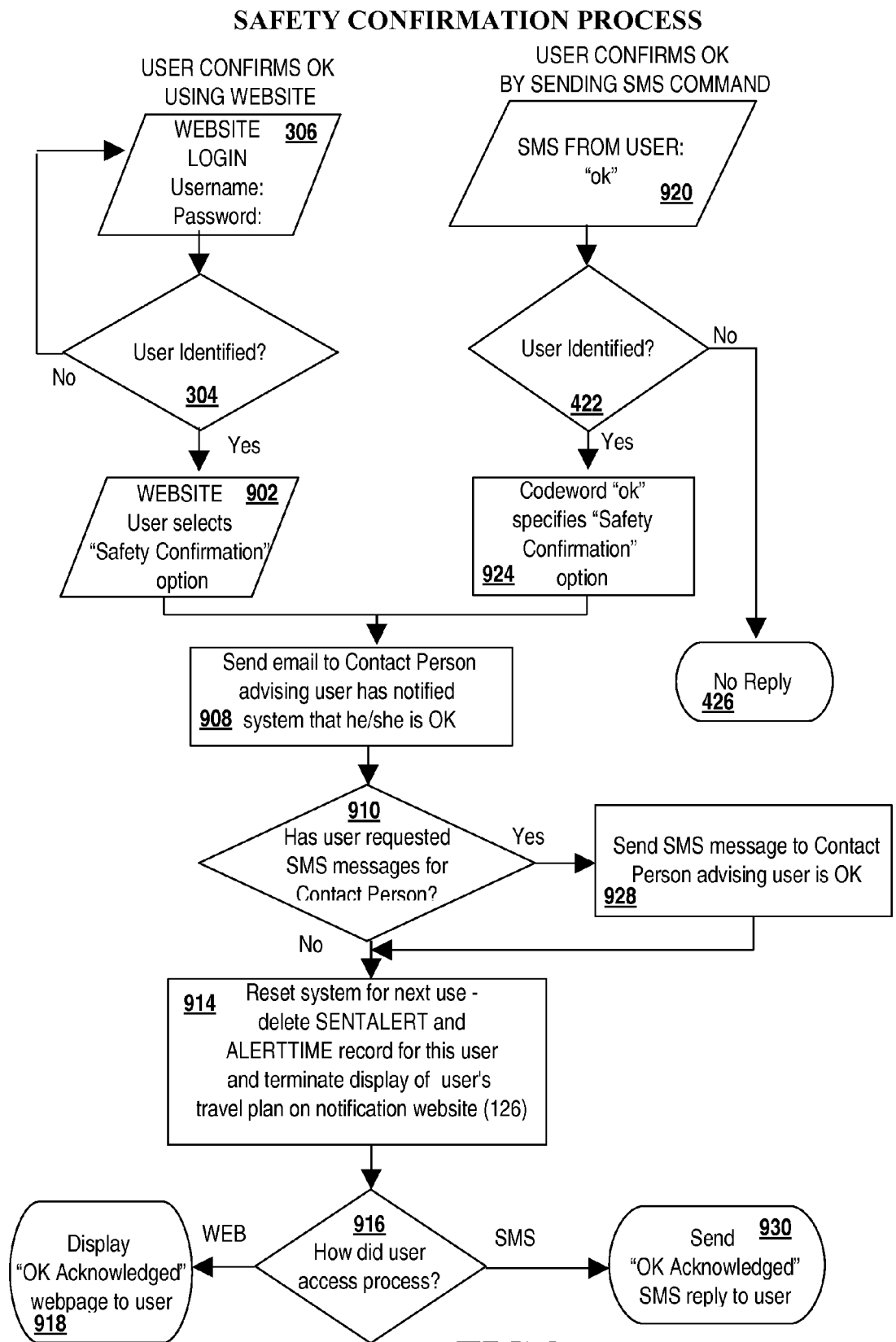
FIG. 9—Safety confirmation process, flowchart showing the steps involved if the user's alert time has passed and the user wishes to advise that he/she is safe.

Safety Confirmation Process (128 and FIG. 9)

In my currently preferred embodiment a safety confirmation process is provided, which is a means for a user 100 of FIG. 1 to notify the system that he/she is safe after having failed to disarm the system before his/her alert time, thereby terminating the alert phase. When the user advises safety confirmation process 128 that he/she is safe a message will be automatically sent to contact person 130 to relay this information. This message will be sent via email and, optionally, text message to the contact person's mobile messaging device 134.

This process is illustrated in FIG. 9. As with some of the previous processes the user may access this process via the system website or by sending a text command message, such as an SMS command message, to the system using his/her mobile messaging device.

In the website access case steps 306 and 304, as described previously, ensure that the user is identified to the system. Once identified step 902 shows that the user selects a link, button or option from the displayed webpage which initiates the safety confirmation procedures.

This process may also be initiated by sending an appropriate text command message to the system. Step 920 shows the SMS command message which is sent from the user to the system. Steps 422 and 426, as previously described in the travel plan data entry process description, identify the user from the sent message and show the response if the sender of the SMS message is not identified.

In other embodiments the safety confirmation process may require a more detailed user identification process, such as the provision of the user's username and password, to be sent in the safety confirmation text command message. This is to reduce the likelihood of a third party person, such as a kidnapper, confirming the user's safety while the user is, in fact, still in danger. Further embodiments may analyze the nature and method of attempts to access the safety confirmation process and react according to a risk/confidence model or score. Such embodiments may, in fact, not actually terminate the alert phase, and contact person 130 would be made aware of the botched safety confirmation attempts.

Step 924 parses the sent message text and determines that the command is for the safety confirmation process by checking for an appropriate keyword in the message text. The reader should note that the actual format of the command message is immaterial so long as step 924 can determine that the message is intended to activate the safety confirmation process.

Step 908, which is accessed either by system website (via step 902) or text command message (via step 924), sends the user's contact person an email message advising that the user has confirmed his/her safety with the system.

If step 910 determines that the user has specified his/her contact person be sent text messages from the system then step 928 sends a text message to the contact person advising that the user has confirmed his/her safety with the system.

In step 914 the system is reset for the next use by the user. In the described example of the currently preferred embodiment this is accomplished by deleting the SENTALERT and ALERTTIME records associated with this user. Also in this step, access to notification website (126 from FIG. 1) by contact person 130 is terminated. In another embodiment, access to the notification website 126 (FIG. 1) is not immediately terminated but the information displayed therein is modified to indicate to the contact person that the user has confirmed his/her safety.

If step 916 determines that the user accessed the safety confirmation process via the system website then step 918 responds by displaying a webpage which acknowledges that the user has successfully confirmed his/her safety. If, however, the user had sent a text command message to access this process then step 930 sends an acknowledgment text message to the user's mobile messaging device 104.

In another embodiment contact person 130 (from FIG. 1) may indicate to the system that the user is safe, by clicking on a link in notification website 126 (FIG. 1). This might be done if the contact person had independently received confirmation that user 100 (FIG. 1) is safe but unable to confirm his/her safety personally. Such safety confirmation by a contact person would cause safety confirmation messages to be sent to the user and any other contact person or entity the user may have specified. A facility to include a text description, explaining the reason and nature of the safety confirmation by the contact person rather than the user personally may be requested or required by website 126, information which would also be made available to the user and any other specified contact persons or entities.

In another embodiment an "Instant Messaging" safety confirmation may be sent to contact person 130. Such an embodiment includes receiving and storing instant messaging address details from user 100 for contact person 130 as part of the contact person data entry process 114 (of FIG. 1).

In another embodiment contact person 130 (FIG. 1) may, after receiving an alert advising that information is available on notification website 126 and being provided with access details, send a formatted text command message to the system to request that user 100's travel plan, either in full or an edited version, be sent to the contact person's mobile messaging device 134. This covers the case where contact person 130 does not have convenient access to an Internet-connected device capable of viewing websites. This is not considered as automatic notification to the contact person's mobile messaging device by notification process 124, as it is in response to a directed request from the contact person.

In some embodiments when a user or contact person accesses the safety notification process to advise of the safety of the user he/she may be requested or required to enter some information regarding the reason for the user failing to disarm in time. This information may be used, along with statistical records of the user's usage pattern and past failures to disarm, to derive a "user reliability" rating. Such a rating may be used to demonstrate to the contact person, and any authorities the contact person enlists, a level of confidence that the user is a reliable user and that an alert is unlikely to be a false alarm. This will also act as an incentive to the user to regularly disarm before his/her alert time, so as to develop a good user reliability rating.

Someone skilled in the art may create a safety confirmation process of a different structure but which performs an equivalent role. Such variations are covered by the claims.

Figure 10:
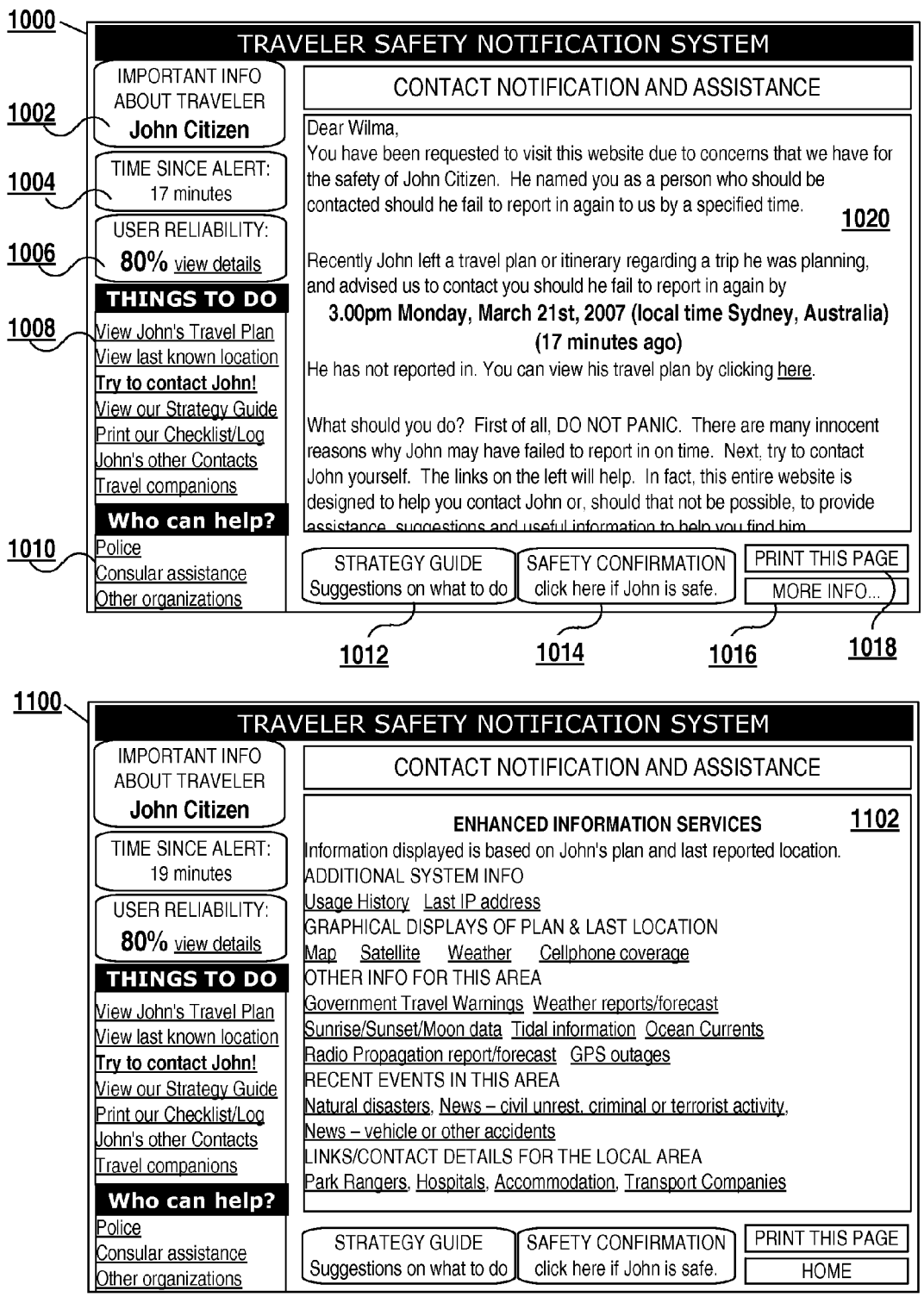
FIG. 10—Notification website, example of webpages which may be displayed to a contact person visiting the notification website.

Notification Website (FIG. 10)

In the event that user 100 (from FIG. 1) fails to disarm the system prior to his/her specified alert time notification process 124 prepares notification website 126 for viewing by contact person 130. This website is available for access by the contact person during the alert phase, which is the time period starting from the user's alert time (or the time of emergency activation by the user) and ending when a safety confirmation indication is received. Website 126 may be a part of the system website (not shown) as accessed by user 100 when configuring the system, or may be a separate website altogether.

Contact person 130 is alerted by the system, by way of an email message or a mobile messaging text message (e.g. SMS message) indicating that important information is available on website 126, and providing access details for that website. Such access details will include the Internet address (URL) of the notification website, or of another website which links to the notification website, and may include specific identity-based information. An example of this, as in my currently preferred embodiment, would be the provision of a unique access code which must be provided by the contact person when accessing the notification website. Such an access code would be provided in both email and mobile messaging text messages. In the email case, the URL and the access code may be combined in a link, such that when the contact person clicks on the link in their email message their browser is automatically directed to the notification website and the access code is automatically provided to that website. Alternately, the access code may be entered when requested by the notification website.

Additional identity confirmation information may be requested or required of the contact person before they are admitted to information regarding the user. Examples of this may be the entry of their email address or mobile messaging address (e.g. mobile phone or cellphone number), which are known to the system by virtue of the Contact Person data entry process. Other information may be a specific code or password provided by the user to the contact person, or the answer to a "question-and-answer" quiz set up by the user during that contact person data entry process.

An example of two pages of a notification website under my currently preferred embodiment are illustrated in FIG. 10.

Webpage 1000 illustrates a page which might be shown to a contact person after first visiting the notification website and entering information as may be required to confirm that person's identity and respective user, such as the access code.

Item 1002 shows the name of the user to which this notification refers.

Item 1020 is a welcome, presenting the contact person with an introduction and a little background to the service. Also presented are the most important information components, being the alert time and a link to the user's travel plan. Various embodiments may include different display arrangements, such as including the travel plan or parts thereof in this welcome page. The alert time may be displayed in any of 1) the user's local time (at departure location, destination location or last known position); 2) the contact person's local time; 3) another time reference, such as UTC/GMT.

Item 1004 shows a timer which gives an indication of the time since the alert. In some embodiments the actual time, in the user's local time and/or in the contact person's local time, or both, may be displayed. An advantage of using a timer is that any confusion which may arise due to timezone differences is eliminated and a "time pressure" or "urgency" feeling is engendered in the contact person.

Item 1006 shows a "user reliability" indicator, which is designed to be a confidence indication regarding the likelihood of a false alarm. If the user has a history of regularly forgetting to disarm the system in time (representing, therefore, a false alarm event) this fact will be represented in the user reliability score. A "view details" link is shown, which would cause an explanation of the user reliability to be displayed and the comments entered in relation to past alert events (such as, possible good reasons for past failures to disarm). Various embodiments may include variations on this theme, such as a color-coded or otherwise graphical user reliability indication. The use of a user reliability indicator is seen as an encouragement to the user to regularly remember to disarm the system before his/her alert time, so as to maintain a high level of credibility (high user reliability rating).

Item 1008 is a list of links to further information, also representing a suggested strategy for the contact person to follow. While some people are clear-headed in all circumstances many people would appreciate some guidance during a time of stress (such as may be caused by the receipt of a notification from my system). Item 1008 includes links to display the user's travel plan and, if available, the user's last known location. This last known location may be available to the system because it was told to the system by the user, such as the inclusion of position or location information in a communication from the user.

Also included in item 1008 is the advice to "try to contact" the user. To facilitate this the system may display the user's known contact details as provided by the user using registration process 112 (of FIG. 1), and provide assistance such as suggestions regarding telephone prefixes (e.g. international dialing codes or area codes) and suggestions as to where might be good places to call to try to locate the missing user.

Item 1008 also includes links to a "strategy guide" and a "checklist/log" form which may be viewed and/or printed. A range of advice regarding the steps a contact person might take under various circumstances can be made available. Similarly, a checklist of contact attempts and other efforts may be printed. Such documentary evidence will likely be of benefit to the contact person should he/she try to enlist the help of the authorities.

The contact details for other contact persons specified by the user, if any, can be viewed. This will be useful information to the contact person as perhaps another contact person has news of the user. Also, such contact between contact persons will help them to coordinate their efforts, thus resulting in a more effective search.

The final link shown in item 1008 is for "travel companions". This draws information from the user's travel plan about people he/she may have been traveling with. Such information may be of assistance to the contact person, possibly suggesting that he/she might call the parents of one of the user's traveling companions the see if they have heard anything. Travel companion information may also be displayed drawn from previous travel plans as, sometimes, groups of travelers part their ways but the ex-companions may be a valuable source of information about where the user went.

Item 1010 shows a "who can help" section. The notification website can display contact details for various authorities which may be of assistance. Such information may be provided generically (such as a list which the contact user may peruse) or as a tailored list based on known information about the user, or his/her approximate location or country. For example, of particular interest for a person traveling abroad may be consular assistance contact details for the user's country of citizenship, police help line for the country of citizenship, embassy contact in the country of travel, police force in the country of travel. All of this can be tailored based on available information. Other organizations may also be included such as, for example, search and rescue organizations with an expertise in a particular region, or humanitarian organizations operating in a particular area.

Item 1012 provides a link to the previously mentioned "strategy guide". In this website example this is displayed prominently as it is considered an important aid to the contact person to be considered early in their search efforts.

Item 1014 shows a link which will allow the contact person to access the system's safety confirmation process. The contact person may have received confirmation that the user is safe but the user is unable to confirm his/her safety directly. The contact person is therefore provided with a means of confirming the user's safety with the system. Such a safety confirmation may require that the contact person enters a comment regarding this action, and all contact persons will be sent a safety confirmation message by email and/or mobile messaging.

Item 1018 presents a "print this page" link, which is indicative of the fact that the contact person can print any or all of the information presented in this notification website for future reference or for provision to the authorities when enlisting their help.

Item 1016 is simply a link to a further page of information which, in this simple example of a notification website, is illustrated as webpage 1100.

Webpage 1100 is largely the same as webpage 1000 except for the information display area 1102. In this display a range of additional information, or enhanced information, services are presented. While the previous webpage presented basic and fundamental information directly provided by the user or directly useful in the location of the user, webpage 1102 shows that a range of indirect and yet possibly useful information based on the user's previous uses of the system and approximate location can be presented.

Certain information regarding the user's previous usage of the system may contain useful information. For example, records of his/her recent previous travel plans (usage history) may provide contact details for youth hostels the person has recently stayed at, places he has recently gone which may be contacted, etc. The "last IP address" item is a record of the Internet-address used by the user the last time he/she accessed the system website. In some cases an approximate region may be determined by reference to externally available Internet-databases, although this is certainly an imprecise location method with highly variable results. It may, however, provide a level of confidence that information provided to the website is correct and has not been tampered with or faked by a nefarious third party.

An approximate area for the user can be determined from information provided by the user, for example somewhere in the general vicinity of the user's travel plan or route, or an exact or approximate location may have been provided during an emergency activation message or during a travel plan update message sent to the system. A range of information relevant to this approximate location or area can be therefore be presented, either being retrieved and displayed by the system, or accessed externally (e.g. links to third party webistes).

For example, the user's planned route and, if known, last location may be displayed in, or overlaid on, a map. Such a map may be, of course, a composite image made up of other maps or parts thereof. Similarly, the user's route may be displayed on or in a satellite image, or a cellphone or mobile phone coverage map. Of particular value may be the overlay of weather maps of various kinds, indicating the weather currently affecting the area or forecast to affect the area. Such information is of particular relevance to the speed required in enlisting the authorities (i.e. adverse conditions seriously reduce survival time) and the ability of search aircraft to operate, for example.

Display area 1102 in webpage 1100 also shows that a range of other information of potential relevance may be presented, selected based on facts known about the user such as an approximate location (travel plan and reported location information), and country of citizenship, for example. Such information may be retrieved prepared in advance by the system (for example, at the user's alert time) and/or actually retrieved and prepared when the contact person visits the website. Such information may also be regularly or occasionally updated by the system, such that contact person 130 is presented with up-to-date information. The contact person may, in some embodiments, be alerted to the presence of new information on website 126 by an additional email or mobile messaging text message. Such information may be presented from data held within the system, retrieved from external sources via the Internet, or presented simply as links to external Internet sources which the contact person can visit directly for relevant information.

Examples of such information sources are as follows:
Government travel warnings, as issued by the governments of some countries for their own citizens, which may highlight the risks of travel in a particular country and suggest who to contact if problems arise. Also may contain consular assistance information;
Weather reports and forecasts;
Sunrise/Sunset/Moon data, predictions of daylight and moon phase, relevant to the times available for a most effective search;
Tidal information, relevant in some coastal regions as high tides, or unusually high tides might present a reason for the traveler's delay;
Ocean currents, may be of relevance to a stranded mariner with a broken propulsion system.
Space weather, radio propagation reports and forecasts and GPS outage information may all be relevant to a user not being able to contact the system to disarm it. For example, a significant solar flare event might disable, at least temporarily, GPS navigation and satellite communications networks.
Natural or civil disaster reports or predictions, News, events, transport vehicle accident reports, etc. Various information sources may provide information about events in the area, such as local news reports or reports and warnings provided by environment monitoring authorities (e.g. earthquake/tsunami monitoring).
Reports or warnings regarding criminal, terrorist or military activity in the area.
Links and contact details for the local area, may include various local contacts which may be considered useful, such as park rangers, hospitals, security services, search and rescue services and medical evacuation services.

One of the reasons for providing information via a website rather than sending it directly in an email message is the security of that information. Email is not a secure communications medium, with the information therein transmitted in plain text and, by the very nature of the Internet itself, passing through a multitude of unknown computers on its journey from sender to recipient. Encryption techniques are possible, but they require a level of Internet knowledge currently beyond the general populace and likely to remain so for people many people with rudimentary Internet skills. This group may well include the parents of young travelers, a group who are a prime target as candidates to be a user's trusted contact person. Thus any requirement to use advanced email encryption techniques would reduce the range of contact people comfortable in using the system or may increase reluctance and/or delay in response time by those people. This would be far from ideal. Thus the information security problems of the prior art by Fairweather (US 20040220841) and Vellotti (US 20040198315) are addressed by my system.

Another key reason for using a website for notification as opposed to a directed email is the ability, via a website, to provide a wide range of other useful information as described above. Certainly a range of additional information could be provided in an email, but the risk here is of information overload reducing the effectiveness of the key message of the email. This risk can be reduced by careful information structure design in a website.

There are innumerable ways of presenting information on a website or on the webpages within a website and the described example should only be seen as indicative of the types of information which may be displayed. Nothing in the informational structure, layout or means of operation of the example of the notification website described should be seen as limiting the operation of such a website or the scope of my claims.

Advantages

The described embodiments allow an individual user to leave details of an upcoming trip or excursion without concerning his/her family or friends unless something goes wrong. This provides an advantage if the user does not wish to needlessly concern or upset his/her loved ones and yet would still like those people to be advised if something does go wrong during his/her travels, as the contact person specified by the user is only notified by the system if the user's safety is in doubt.

Sometimes directly contacting a friend or family member to leave specific details presents problems, particularly if the traveler is far from home. Issues such as large distance or timezone differences may make such communications inconvenient or expensive. The fact that the described embodiments do not require direct communication with those loved ones is therefore an advantage.

It may be that a traveler far from home would prefer to leave details with someone closer to where he/she actually is traveling, but may not know anyone in the area. Even if he/she can find someone to tell no one is going to move heaven-and-earth to locate him/her if he/she should go missing like a relative or friend. Thus the described embodiments may be considered advantageous when compared with telling someone locally or leaving details in a rarely checked logbook.

Even if the traveler does leave a detailed description of a trip or journey in a visitor book or ranger's logbook, for example, often such logbooks will not be checked until a person is actually reported as missing. It is the actual step of reporting someone as missing which initiates a search. The described embodiments are advantageous over simply leaving a written itinerary description as the alert sent to the contact person in the event that the user's safety becomes in doubt is the act which will prompt the contact person to seek more information and initiate a search-and-rescue operation, possibly enlisting the help of the authorities.

The embodiments provide, if the notification process is activated, a written record of information about the missing traveler's plans and other information about the user which may, in the first instance, help the trusted contacts locate the missing person themselves. Should it be deemed necessary, such written information will help those contacts enlist the assistance of the authorities to conduct a larger scale search or search-and-rescue operation.

An important feature of any system is simplicity. My embodiments include a very simple disarming usage method in which the user need simply identify themselves (via website or sending a text message with their own phone) and select "disarm". This is in contrast with prior art U.S. Pat. No. 7,047,203 to Johnson (2006), in which an additional "cancellation code" specific to the user's particular instance of using his system must be provided before the system will "cancel the itinerary". In Johnson's disclosure it is apparent that if this additional cancellation code is not provided by the user then the user is unable to "cancel the itinerary". Thus Johnson's "call back function" would be activated simply because the user could not remember this extra piece of information, an event which would be considered a false alarm as the user of his system is not actually in danger. My embodiments thus present the direct advantage to the individual of ease-of-use, and thereby in the reduction of false alarms attributable to unnecessary system complexity.

This simplicity also provides a benefit in the overall safety system sense. In any system an excessive number of false alarms will degrade the response of the person or entity, even to the point where they ignore an alert or alarm all together. Thus any design which reduces false alarms is advantageous in that the responding person or authority is more likely to respond to an actual alert (an alert due to an actually hazardous situation) quickly and with gusto.

The overall safety system includes the contact person and any authorities that may be relevant to a search for a missing person, such as police forces, search-and-rescue organizations, The Red Cross, etc. As mentioned in the description, my embodiments allow any person or entity to be specified as a contact person. Key features of these embodiments, however, lend themselves to the use of a private individual as a contact person. By using a private individual as a contact person many false alarms caused by the user simply forgetting to disarm the system will be sorted out by that contact person before any approach is made to the authorities. Thus, the level of false alarms to the authorities is reduced thus increasing the likelihood that those authorities will respond quickly when actually needed.

My embodiments of a notification process include written notifications, therefore representing a significant improvement over the telephone call notification method described in prior art U.S. Pat. No. 7,047,203 to Johnson (2006). A telephone call is prone to misinterpretation and forgotten details, particularly in consideration of the fact that such notification may be quite stressful to the contact person, and there is no record of the call. These problems are overcome by the written notifications of my embodiments.

It can be difficult to enlist the help of the authorities quickly, with the concerns of parents about a lack of contact from a son or daughter sometimes being dismissed as the "unreliability of youth". In such cases it would be an advantage to have a written record of the user's itinerary etc., so as to have something to show the authorities. Johnson's system provides no such record, but my embodiments do.

In addition, a disadvantage of a telephone call based system such as Johnson's is that, if the contact person is not contactable by telephone at the time or times attempted, the contact person may have no record whatsoever of the alert. My described embodiments provide alert delivery using methods which will provide an alert irrespective of the current availability of the contact person. Thus, when the contact person eventually does become available for contact (by turning on his/her cellphone or checking his/her email messages) he/she will be made aware of the alert.

Other prior art U.S. Pat. No. 7,026,928 to Lane (2006) discloses a system which also monitors the safety of a mobile user by sending continual communications messages to the user based on a the configuration of a complicated schedule process. A significant advantage that my embodiments have over Lane's disclosure is that continual telecommunications contact is not required. Thus, as user can setup and arm my system and then go to a remote area outside communications coverage, so long as they return again to within communications coverage in order to disarm my system. A further advantage is the simplicity and ease-of-use of my embodiments, which have no requirement for a complex schedule of contact times and places.

U.S. Patent Application 2002/0107927 by Gallant described a safety system which, while having a similar timing and alert activation structure to my described embodiments, relies for its efficacy on the interrogation of a wireless device held by the user, and is generally of little value in the location of the user if this undescribed process cannot be performed. Further, mobile phones or cellphones, and the telecommunications networks used by them, generally do not universally have such a function built-in. My system is therefore advantageous over Gallant's in that no exotic position interrogation process is used, the user is not required to be in telecommunications contact at the time of the alert notification, and the user does not require an exotic wireless device, thereby opening the system up for use by the widest possible audience.

U.S. Patent Application 20040220841 (Fairweather) and U.S. Patent Application 20040198315 (Vellotti) both disclose systems which, while clearly aimed at the maritime monitoring role, have many similarities with my embodiments, but which both suffer from the risk of unsecured transmission of personal data via email. Fairweather specifically claims that email notifications to contact persons will include itinerary and personal information and suggests that a digital signature be appended to the email notification as a means of message authentication. As discussed earlier, such methods add complexity for the recipient who must install a "digital certificate public key" on their computer in order to obtain any authentication function. This is not even possible with commonly used web-based email programs such as Hotmail, further limiting the efficacy of this process.

Due to the "security alert" message displayed by some email programs on receipt of an email containing a digital signature if the user has not previously installed the public key for that sender, the use of such signatures may, in fact, cause more doubt about message authenticity that would otherwise exist. The addition of a digital signature also does not prevent the creation of imitation alert messages by ill-intending third parties unless the intended recipient is specifically expecting a digital signature to be included (which is generally not the case with the general public). My embodiments, by the provision of personal and travel plan information over a secure notification website, are therefore advantageous in that they simply and reliably provide verifiable data delivered securely over an encrypted channel, and no specific additional steps need be taken by the user or recipient to gain this protection. Thus my embodiments protect data integrity and minimize barriers to use, thus enhancing usability for the broadest possible audience.

Velotti also describes the use of voice recognition techniques to allow a user to set and modify trip/alert information and to deactivate his system after use. My system, using mobile messaging methods is advantageous in that voice recognition data errors are eliminated, call cost to the user reduced, and power consumption of the user's device reduced. In addition, the provision of a global multilingual service is simplified by the use of mobile messaging compared to voice recognition.

In the general sense, if a user is in danger he/she might simply make a telephone call using a mobile phone or cellphone, if in telecommunications coverage at the time. This is a perfectly reasonable thing to do, and yet the notification process emergency activation method included in some of my embodiments may still provides an advantage if used in conjunction with such a call, as the detailed information thereby made available to the contact person may provide beneficial supplementary information.

A further advantage would be if the battery charge on the user's mobile messaging device was almost expired. By sending an emergency activation text command message notification is made to the contact person with minimal power expenditure by the user's mobile messaging device. If the user subsequently makes a telephone call to the contact person using that device and the call is terminated by a flat battery in that device the user may be assured by the fact that at least the written notification would have been sent.

Thus the described embodiments provide significant advantages over the existing prior art, thereby enhancing the safety of travelers.

CONCLUSION, RAMIFICATIONS AND SCOPE

The embodiments described provide a system which is easy to use, which accepts travel plan information about an upcoming trip, and provides timely alert notifications to trusted contact persons should the traveler be unable, for whatever reason, to disarm before a specified alert time. Should that occur such notifications are presented to the contact persons in such a form that they are securely provided with a high level of information detail, and in a written form. Such written notification will be of assistance to the contact person should they subsequently alert the authorities.

Such a system, which may be provided globally, aids the timely provision of assistance to a traveler who suffers misadventure, ranging from a simple travel delay through to injury, kidnapping or assault. By using this system a traveler improves his/her chance of being rescued from an unforeseen predicament and, should this misadventure be due to a criminal act, the rapid and effective response which this system assists will enhance the chances of apprehension of the perpetrators.

While being of particular benefit to travelers or people going on any kind of trip, excursion or outing the system should not be seen as being limited to use by such people. For example, the embodiments may be used by any person who requires a notification system based on message delivery after a specified alert time, irrespective of whether they are actually going somewhere.

In some parts of the above description the term "SMS" has been used in reference to mobile messaging. Any such use of the term "SMS" should be taken to be merely one example of a mobile messaging method, format or system, and should not be seen as limiting the scope of the embodiments to the use of SMS messaging alone.

As technology and communications devices evolve, the line between a computer and a mobile messaging device becomes blurred. For example a mobile messaging device such as a mobile cell phone may also be an Internet-connected device allowing the receipt of email and viewing and interaction with Internet websites. Thus email becomes a form of "mobile messaging" due to its ability to be sent to a wireless (mobile) device. Similarly "Instant Messaging" messages conventionally sent to a Internet-connected device may now be sent to a "mobile messaging device" which happens to be connected to the Internet and thus are a legitimate form of mobile messaging. Another example of such convergence may be the advent of mobile telephones which communicate using Voice-over-Internet-Protocol (VoIP), thereby providing all of the functions of a conventional mobile phone but with communication via the Internet. While the definitions of what is an "Internet-connected device" and what is a "mobile messaging device" may vary, this evolution should not limit the scope of the claims.

Mobile messaging message formats and delivery specifics vary. A particular communications solution is considered "mobile messaging" for message delivery by my described embodiments if a message including text can be sent to an address uniquely associated with an individual or entity, retrievable or viewable by that individual or entity using a mobile (wireless, portable) communications device. A communications solution is considered "mobile messaging" with regard to text command messages if a communication sent to my described embodiments by a user from a mobile (wireless, portable) communications device can be used to identify the user, determine the command request type and provide additional information in the content of the communication or sent with the communication. Within these guidelines the technology or methodology of the mobile messaging solution should not limit the scope of the claims.

Similarly, where reference is made to the system website, notification website, webpages or webpage forms these terms should not be seen as limiting the scope of the claims to any specific Internet format or access method. For example, a website may be accessed using a computer, a personal digital assistant, a mobile phone or cellphone, a portable music device, or any other such device, even though the website may need to be provided in a different format for use by these different devices. All such formats are to be considered as applying to the system website and the notification website and, therefore, the devices used to access these websites or the formats in which they are displayed, are irrelevant and should not limit the scope of the claims.

While the above description contains many specificities, these should not be construed as limitations on the scope of any embodiment, but as exemplifications of the presently preferred embodiments thereof. Many other ramifications and variations are possible within the teachings of the various embodiments. For example, processes and process steps may be reordered, reversed, split or combined, and certain features of the invention may be utilized independently, all as would be apparent to one skilled in the art after having the benefit of this description of the embodiments.

Thus the scope of the invention should be determined by the appended claims and their legal equivalents, and not by the examples given.

I claim:

1. A traveler safety notification system, being an internet-based computer and data storage arrangement of known type configured to perform processes so as to provide a service to a plurality of users, accessible to said users by way of an internet website incorporating known user identification techniques, comprising:
   a) a means of user registration, in which personal information including an email address is received from a user of said system and said personal information is stored associated with said user for later retrieval;
   b) a means for receiving from said user contact details for a contact person in which said contact details, including an email address for said contact person, are received and stored associated with said user for later retrieval;
   c) a means to receive from said user travel plan information to be held by said system, in which said travel plan information is received and stored associated with said user for later retrieval;
   d) an arming process, being a means for a user to initiate a monitoring process, in which an alert time or interval is received and stored associated with said user, and said monitoring process is initiated;
   e) a disarming process, being a means for a user to terminate said monitoring process, in which a disarm request is received from said user and said monitoring process is terminated for said user;
   f) said monitoring process, being a means for monitoring said alert time or interval, in which if said alert time or interval expires then a notification process is activated;
   g) said notification process, being a means for notification of said contact person, in which said travel plan information is made available to said contact person on a secure notification website and said contact person is alerted by email;
   whereby the safety of said user is enhanced by the storage of said travel plan information, monitoring of said alert time or interval, and the provision of said travel plan information to said contact person if said user fails to disarm said monitoring process before expiry of said alert time or interval.

2. The traveler safety notification system of claim 1 further comprising a means of mobile messaging address registration, in which a mobile messaging address is received from said user and stored associated with said user for later retrieval.

3. The traveler safety notification system of claim 1 further comprising a means of travel plan data entry by text message, in which a text message indicating the process of travel plan data entry is received from said user sent by way of mobile messaging, and travel plan information within such text message is stored associated with said user for later retrieval.

4. The traveler safety notification system of claim 1 further comprising:
   a) a means of setting said alert time or interval and arming said system by text message, in which a text message specifying the arming process is received from said user sent by way of mobile messaging, alert time or interval information is extracted from said text message and stored associated with said user for later retrieval, and said monitoring process is activated for said user, thereby arming said system;
   b) a means of disarming said system by text message, in which a text message specific to the disarming process is received from said user sent by way of mobile messaging and said monitoring process is terminated or suspended for said user.

5. The traveler safety notification system of claim 1 further comprising a means of reminding said user to disarm the system, in which the system may send a reminder message to said user at a time approaching the expiry of said user's alert time or interval, by email and/or mobile messaging text message.

6. The traveler safety notification system of claim 1 wherein said notification process includes a means of alerting said contact person by mobile messaging text message.

7. The traveler safety notification system of claim 1 further comprising a means of user safety confirmation, in which confirmation of said user's safety is received by way of a website or mobile messaging text message from said user, and safety confirmation information is sent to said contact person by email and/or mobile messaging text message.

8. The traveler safety notification system of claim 1 further comprising a means of providing an emergency activation facility in which said user can activate said notification process immediately by sending a mobile messaging text message to said system.

9. The traveler safety notification system of claim 1 wherein said notification website includes a means of graphically displaying geographical position information regarding said user's current, recent, planned or predicted position overlaid on or included in one or more images selected from the group consisting of map or composite thereof, satellite photograph or composite thereof, aerial photograph or composite thereof, geographic model, drawing, sketch, diagram and artwork.

10. The traveler safety notification system of claim 1 wherein said notification website also includes a means of presenting information, wholly or in part, entirely within said notification website or which may include a link or reference to an external website or information source, based on and relevant to said user's approximate geographical location, selected from the group consisting of weather reports, weather forecasts, cellphone coverage, sunrise/sunset data, tidal information, ocean current information, travel warnings, natural or civil disaster reports or predictions, vehicle accident reports, civil unrest reports or warnings, criminal activity reports or warnings, terrorist activity reports or warnings, military activity reports or warnings, space weather reports and forecasts, radio propagation reports or predictions, GPS outage reports or warnings, news reports, hospital contact details, accommodation details, transport company details, security services details, search and rescue services details and medical evacuation services details.

11. A method of using an internet-based computer and data storage arrangement of known type configured to perform processes so as to provide a service to a plurality of users, accessible to said users via an internet website and by the transmission and reception of mobile messaging text messages, incorporating known user identification techniques, comprising:
   a) receiving personal details about a user, including an email address, and storing said personal details for later retrieval;
   b) receiving from said user contact information, including an email address, for a contact person or entity who will be contacted by said system if the safety of said user is in doubt, and storing said contact information for later retrieval;
   c) receiving from said user travel plan information, and storing said travel plan information for later retrieval;
   d) receiving from said user an alert time or interval, storing said alert time or interval for later retrieval and initiating monitoring of said alert time or interval for said user for determining whether said alert time or interval has passed without said user terminating said monitoring;
   e) receiving from said user a request to terminate monitoring of said alert time or interval, and terminating monitoring of said alert time or interval for said user;
   f) if alert time or interval has passed without said user requesting termination of alert time or interval monitoring then making said user's said travel plan information available to said contact person on a secure notification website and alerting said contact person by email;
   whereby said user's safety is enhanced by the provision to said contact person of information which may be of assistance in locating said user if said user's safety is in doubt.

12. The method of claim 11 further comprising receiving from said user a mobile messaging address and storing said mobile messaging address for later retrieval.

13. The method of claim 11 wherein said notification process may also alert said contact person by mobile messaging text message.

14. The method of claim 11 further comprising receiving a safety confirmation indication from said user received by way of said system website or mobile messaging text message from said user, and then sending safety confirmation information to said contact person by email and/or by mobile messaging text message.

15. The method of claim 11 further comprising sending a reminder message by email and/or by mobile messaging text message, to said user at a time approaching the expiry of said alert time or interval.

16. The method of claim 11 further comprising receiving an emergency activation request from said user sent as a mobile messaging text message thereby causing an alert to be sent to said contact person by email and/or mobile messaging text message and making said user's travel plan information available to said contact person on said notification website.

17. The method of claim 11 wherein said notification website includes graphically displaying geographical position information regarding said user's current, recent, planned or predicted position overlaid on or included in one or more images selected from the group consisting of map or composite thereof, satellite photograph or composite thereof, aerial photograph or composite thereof, geographic model, drawing, sketch, diagram and artwork.

18. The method of claim 11 wherein said notification website includes the presentation of information, wholly or in part, which may include a link or reference to an external website or information source, based on and relevant to said user's approximate geographical location, selected from the group consisting of weather reports, weather forecasts, cellphone coverage, sunrise/sunset data, tidal information, ocean current information, travel warnings, natural or civil disaster reports or predictions, vehicle accident reports, civil unrest reports or warnings, criminal activity reports or warnings, terrorist activity reports or warnings, military activity reports or warnings, space weather reports and forecasts, radio propagation reports or predictions, GPS outage reports or warnings, news reports, hospital contact details, accommodation details, transport company details, security services details, search and rescue services details and medical evacuation services details.

19. The method of claim 11 wherein said notification website and/or messages sent to said contact person includes a user reliability indication, being a numeric or graphical rating determined, at least in part, on said user's past failure or failures to request termination of alert time or interval monitoring.

20. A traveler safety notification system, being an internet-based computer and data storage arrangement of known type configured to perform processes so as to provide a service to a plurality of users, accessible to said users by way of an internet website incorporating known user identification techniques, able to be accessed by said users using an internet website access device, comprising:
   a) a means of user registration, in which personal details including an email address are received from a user of said system and said personal details are stored associated with said user for later retrieval;
   b) a means of mobile messaging device registration, in which a mobile messaging address for said user is received from said user and said mobile messaging address is stored associated with said user for later retrieval;
   c) a means for receiving from said user contact details for a contact person in which said contact details, including an email address and, optionally, a mobile messaging address, for said contact person are received and stored associated with said user for later retrieval;
   d) a means to receive from said user travel plan information to be held by said system, in which said travel plan is received from said user via said website or mobile messaging text message, and stored associated with said user for later retrieval;
   e) an arming process, being a means for a user to initiate a monitoring process, in which an alert time or interval is received from said user via said website or mobile messaging text message, and stored associated with said user for later retrieval, and said monitoring process is initiated for said user;
   f) a disarming process, being a means for a user to terminate said monitoring process, in which a disarm request is received from said user via said website or mobile messaging text message and said monitoring process is terminated for said user;

g) said monitoring process, being a means for monitoring for expiry of said alert time or interval, in which if said alert time or interval passes then a notification process is activated;

h) said notification process, being a means for notification of said contact person, in which information associated with said user is made available to said contact person on a website and said contact person is alerted by email and/or mobile messaging text message;

i) a means of user safety confirmation, in which confirmation of said user's safety is received by way of a website or mobile messaging text message from said user, and said contact person is notified of said user's safety by email and/or mobile messaging text message;

whereby the safety of said user is enhanced by the maintenance of said travel plan information, monitoring of said alert time or interval, and the provision of said travel plan information to said contact person if said user fails to disarm said system before said alert time or interval.

* * * * *